(12) United States Patent
Shibazaki et al.

(10) Patent No.: US 9,888,226 B2
(45) Date of Patent: Feb. 6, 2018

(54) IMAGE CAPTURING DEVICE AND PROGRAM TO CONTROL IMAGE CAPTURING DEVICE

(71) Applicant: NIKON CORPORATION, Tokyo (JP)

(72) Inventors: Kiyoshige Shibazaki, Higashimurayama (JP); Susumu Mori, Tokyo (JP); Muneki Hamashima, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 1098 days.

(21) Appl. No.: 14/072,340

(22) Filed: Nov. 5, 2013

(65) Prior Publication Data
US 2014/0055576 A1    Feb. 27, 2014

Related U.S. Application Data

(63) Continuation of application No. PCT/JP2012/002978, filed on May 2, 2012.

(30) Foreign Application Priority Data

May 6, 2011 (JP) .................................. 2011-103791

(51) Int. Cl.
*H04N 13/02* (2006.01)
*G03B 35/10* (2006.01)

(52) U.S. Cl.
CPC ......... *H04N 13/0225* (2013.01); *G03B 35/10* (2013.01); *H04N 13/0232* (2013.01);
(Continued)

(58) Field of Classification Search
None
See application file for complete search history.

(56) References Cited

U.S. PATENT DOCUMENTS

2008/0158359 A1*  7/2008  Takeda ................... G01S 11/12
                                                                348/148
2011/0037835 A1*  2/2011  Morino .............. H04N 13/0003
                                                                348/51
2011/0234765 A1*  9/2011  Tanaka ............... H04N 13/0018
                                                                348/47

FOREIGN PATENT DOCUMENTS

CN       101212696 A      7/2008
EP        2290996 A1      9/1998
JP       A-08-047001      2/1996

OTHER PUBLICATIONS

Jul. 3, 2015 Chinese Office Action issued in Chinese Patent Application No. 201280021485.1.

* cited by examiner

*Primary Examiner* — James M Anderson, II
(74) *Attorney, Agent, or Firm* — Oliff PLC

(57) ABSTRACT

With a conventional stereoimage capturing device, it has been difficult to simply determine the present of a depth. An image capturing device includes an image capturing element in which a first parallax pixel group and a second parallax pixel group that output a first parallax image and a second parallax image, respectively, to cause a parallax are arranged at mutually different positions. The image capturing device computes a differential pixel value of each of a plurality of second parallax output pixels in the second parallax image positioned around a target pixel that is a first parallax output pixel of the first parallax image, the differential pixel value being computed with reference to the target pixel, and generates differential data in which a direction of each of the plurality of second parallax output pixels with reference to the target pixel is associated with the corresponding differential pixel value.

17 Claims, 31 Drawing Sheets

(52) U.S. Cl.
CPC ..... *H04N 13/0207* (2013.01); *H04N 13/0257* (2013.01); *H04N 13/0285* (2013.01)

⟨1⟩ WHEN N=2

| CLASSIFICATION OF REPETITION PATTERN | | PRESENCE OF PARALLAX PIXEL | | | PARALLAX PIXEL | PARALLAX ARRAY | CHARACTERISTIC |
|---|---|---|---|---|---|---|---|
| | | Gr | Gb | R, B | | | |
| CLASSIFICATION A | A-1 | YES | YES | NO | Gr AND Gb ALTERNATING | Gr ROW Gr, Gb ROW Gb | QUALITY OF 2D IMAGE IS MAINTAINED TO SOME DEGREE, AND 3D IMAGE IS OBTAINED. |
| | A-2 | | | | | Gr COLUMN Gr, Gb COLUMN Gb | |
| CLASSIFICATION B | B-1 | YES (NO) | NO (YES) | NO | ONLY ONE PIXEL OF Gr (OR Gb) | Gr ROW Gr | HIGH RESOLUTION OF 2D IMAGE IS MAINTAINED, AND 3D INFORMATION IS OBTAINED. |
| | B-2 | | | | | Gb COLUMN Gb (OR Gr COLUMN Gr) | |
| CLASSIFICATION C | C-1 | YES | YES | NO | 2 PIXELS EACH OF Gr AND Gb | Gr ROW Gr, Gb ROW Gb | RELATIVELY HIGH RESOLUTION COLOR 3D IMAGE AND RELATIVELY LOW RESOLUTION 2D IMAGE. |
| | C-2 | | | | | Gr COLUMN Gr, Gb COLUMN Gb | |
| CLASSIFICATION D | D-1 | YES | NO | YES | 3 PIXELS EACH OF Gr, R AND B | Gr ROW Gr, R, Gb ROW B | SUFFICIENT QUALITY COLOR 3D IMAGE, AND INFORMATION OF 2D IMAGE ARE OBTAINED. |
| | D-2 | | | | | Gr COLUMN Rr, Gb COLUMN Gb, B | |
| CLASSIFICATION E | E-1 | YES | YES | YES | 4 PIXELS EACH OF Gr, Gb, R, AND B | Gr ROW Gr, R, Gb ROW B, Gb | RESOLUTION DETERIORATES, BUT HIGHEST QUALITY COLOR 3D IMAGE IS OBTAINED. |
| | E-2 | | | | | Gr COLUMN R, Gr, Gb COLUMN Gb, B | |

FIG. 10

PIXEL ARRAY OF IMAGE CAPTURING ELEMENT (A-1)
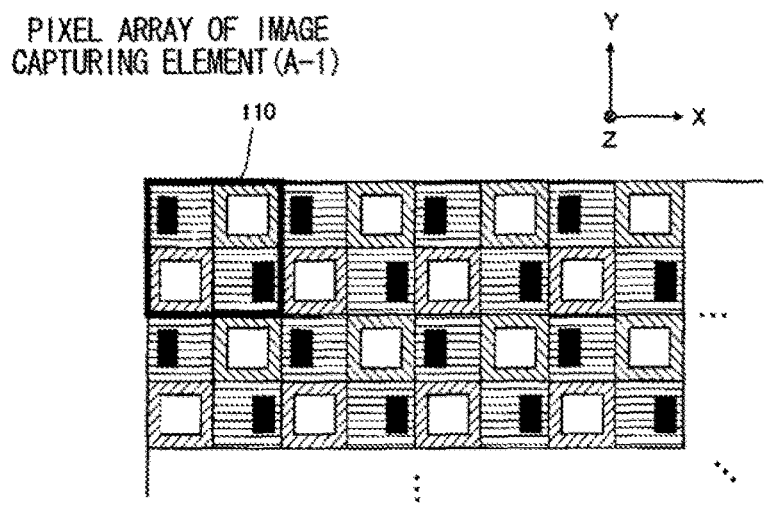
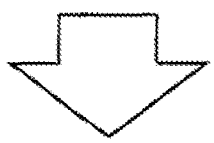
OUTPUT IMAGE
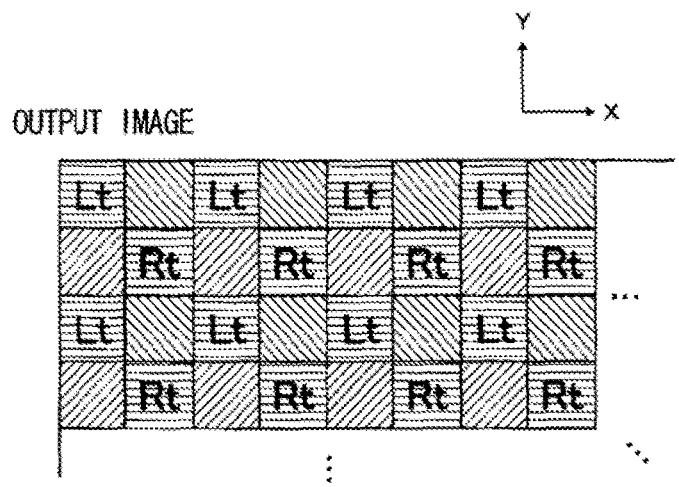
 NON-PARALLAX OUTPUT PIXEL
 LEFT PARALLAX OUTPUT PIXEL
 RIGHT PARALLAX OUTPUT PIXEL
*FIG. 17*

IMAGE CAPTURING DEVICE AND PROGRAM TO CONTROL IMAGE CAPTURING DEVICE

CROSS REFERENCE TO RELATED APPLICATION

This relates to PCT/JP2012/002978 filed on May 2, 2012 which claims priority from a Japanese Patent Application No. 2011-103791 filed on May 6, 2011, the contents of which are incorporated herein by reference.

TECHNICAL FIELD

The present invention relates to an image capturing device and a program to control an image capturing device.

RELATED ART

A stereoimage capturing device that captures a stereoimage including a right-eye image and a left-eye-image by using two image capturing optical systems has been known. Such a stereoimage capturing device generates a parallax in the two images of a single subject captured by using the two image capturing optical systems spaced apart by a certain interval.

Patent Document No. 1: Japanese Patent Application Publication No. H8-47001

SUMMARY

However, the above-described stereoimage capturing device, for example, does not include basic data that allows to easily determine the presence or absence of a depth in a captured an of a subject, and thus requires complicated operations such as a pattern matching process.

A first aspect of the present invention provides an image capturing device including: an image capturing element in which a first parallax pixel group and a second parallax pixel group that output a first parallax image and a second parallax image, respectively, to cause a parallax are arranged at mutually different positions; a differential computing unit that computes a differential pixel value of each of a plurality of second parallax output pixels in the second parallax image positioned around a target pixel that is a first parallax output pixel of the first parallax image, the differential pixel value being computed with reference to the target pixel; and a data generating unit that generates differential data in which a direction of each of the plurality of second parallax output pixels with reference to the target pixel is associated with the corresponding differential pixel value.

A second aspect of the present invention provides a program to control an image capturing device having an image capturing element in which a first parallax pixel group and a second parallax pixel group that output a first parallax image and a second parallax image, respectively, to cause a parallax are arranged at mutually different positions, the program making a computer implement a method including: computing a differential pixel value of each of a plurality of second parallax output pixels in the second parallax image positioned around as target pixel that is a first parallax output pixel of the first parallax image, the differential pixel value being computed with reference to the target pixel; and generating differential data in which a direction of each of the plurality of second parallax output pixels with reference to the target pixel is associated with the corresponding differential pixel value.

The summary clause does not necessarily describe all necessary features of the embodiments of the present invention. The present invention may also be a sub-combination of the features described above.

BRIEF DESCRIPTION OF THE DRAWINGS

FIG. 10 is a table for explaining allocation of parallax pixels in the Bayer array in a case that there are two types of parallax pixels.

FIG. 17 is a diagram for explaining captured image data in a first example.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

A digital camera according to an embodiment of an image capturing device of the present invention is configured to generate images of a single scene captured from a plurality of perspectives with a single operation of image capturing. Such images captured from mutually different perspectives are called parallax images.

Figure 1:
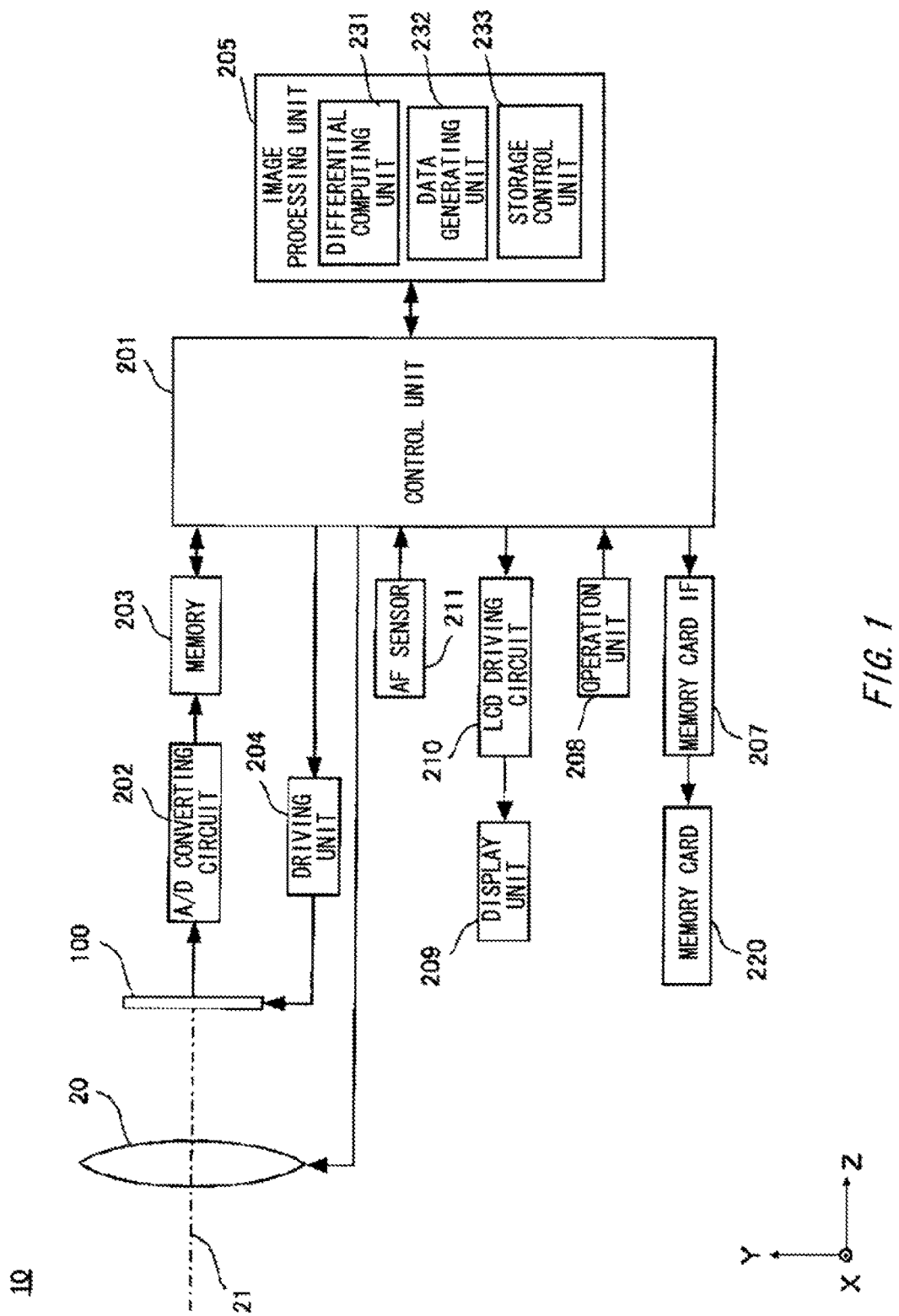
FIG. 1 is a diagram for explaining a configuration of a digital camera according to an embodiment of the present invention.

FIG. 1 is a diagram for explaining a digital camera 10 according to an embodiment of the present invention. The digital camera 10 includes an image capturing lens 20 as an image capturing optical system and guides a subject luminous flux that is incident along an optical axis 21 to an image capturing element 100. The image capturing lens 20 may be a replaceable lens that can be attached to and detached from the digital camera 10. The digital camera 10 includes the image capturing element 100, a control unit 201 an A/D converting circuit 202, a memory 203, a driving unit 204, an image processing unit 205, a memory card IF 207, an operation unit 208, a display unit 209, an LCD driving circuit 210 and an AF sensor 211.

As shown in FIG. 1, the direction parallel with the optical axis 21 of a light heading for the image capturing element 100 is defined as the positive direction of the z axis, the direction toward the near side in a plane orthogonal to the z axis is defined as the positive direction of the x axis, and the upward direction on the paper is defined as the positive direction of the y-axis. In some of the following figures, coordinate axes are shown based on the coordinate axes of FIG. 1 so that directions of each figure can be understood.

The image capturing lens 20 is configured with a plurality of groups of optical lenses, and forms an image of a subject luminous flux from a scene near a focal plane thereof. In FIG. 1, for convenience of illustration, the image capturing lens 20 is shown imaginarily with a single representative lens that is arranged near a pupil thereof. The image capturing element 100 is arranged near the focal plane of the image capturing lens 20. The image capturing element 100 is an image sensor such as a CCD sensor and a CMOS sensor in which a plurality of photoelectric converting elements are arranged two-dimensionally. The image capturing element 100 is timing-controlled by the driving unit 204, converts a subject image formed on a light receiving surface into an image signal, and outputs the image signal to the A/D converting circuit 202.

Also, the image capturing element 100 has a first parallax pixel group and a second parallax pixel group that output a first parallax image and to second parallax image, respectively, to cause a parallax. The first parallax pixel group and the second parallax pixel group are arrayed at different positions. The details are described below.

The A/D converting circuit 202 converts the image signal output by the image capturing element 100 into a digital image signal, and outputs the digital image signal to the memory 203. The image processing unit 205 performs various types of image processes by using the memory 203 as a workplace, and generates image data. The image processing unit 205 additionally performs functions of generating two-dimensional image data as non-parallax image data and parallax image data from the input image signal in accordance with the pixel array of the image capturing element 100, and adjusting the image data according to a selected image format. The generated image data is converted into a display signal by the LCD driving circuit 210, and is displayed on the display unit 209. Also, the image data is recorded in a memory card 220 attached to the memory card IF 207.

Also, the image processing unit 205 has a differential computing unit 231, a data generating unit 232 and a storage control unit 233. The differential computing unit 231 computes a differential pixel value for each of at plurality of second parallax output pixels of a second parallax image output by the image capturing element 100 and positioned around a target pixel that is one of first parallax output pixels of a first parallax image output by the image capturing element 100, the differential pixel value being computed with reference to the target pixel. The data generating unit 232 generates a differential data set including differential data in which the direction of each of the plurality of second parallax output pixels with reference to the target pixel is associated with the corresponding differential pixel value. The storage control unit 233 stores the differential data set in the memory card 220 in a file format. The details of each process are described below.

The AF sensor 211 is a phase differential sensor in which a plurality of ranging points is set for a subject space, and detects the degree of defocus of a subject image at each ranging point. An image capturing sequence starts when the operation unit 208 receives an operation of a user, and outputs an operation signal to the control unit 201. Various operations such a AF and AR that accompany the image capturing sequence are executed under control of the control unit 201. For example, the control unit 201 analyzes a detection signal from the AF sensor 211, and executes focus control to move a focus lens that configures a part of the image capturing lens 20.

Figure 2A:
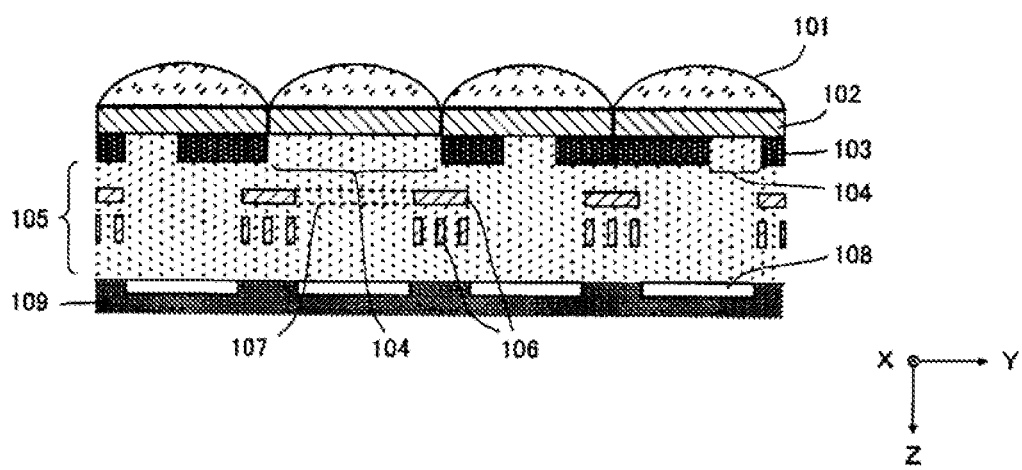
FIGS. 2(a) and 2(b) are schematic diagrams of cross-sections of image capturing elements according to the embodiment of the present invention.
Figure 2B:
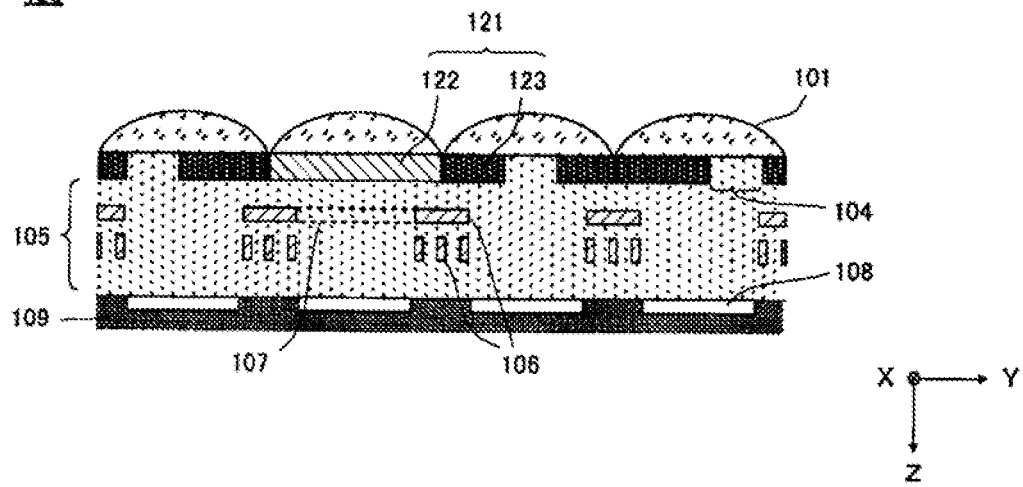

Next, the configuration of the image capturing element 100 is explained in detail. FIGS. 2(a) and 2(b) are schematic diagrams of cross-sections of image capturing elements according to the embodiment of the present invention. FIG. 2(a) is a schematic cross-sectional view of the image capturing element 100 in which a color filter 102 and an aperture mask 103 are configured as separate bodies. Also, FIG. 2(b) is a schematic cross-sectional view of an image capturing element 120 which is a variant of the image capturing element 100, the image capturing element 120 including a screen filter 121 in which a color filter part 122 and an aperture mask part 123 are configured integrally.

As shown in FIG. 2(a), the image capturing element 100 has a configuration in which a microlens 101, the color filter 102, the aperture mask 103, a wiring layer 105 and a photoelectric converting element 108 are arrayed in this order from a subject side. The photoelectric converting element 108 is configured with a photodiode that converts an incident light into an electrical signal. A plurality of the photoelectric converting elements 108 are arrayed two-dimensionally on the surface of a base plate 109.

Signals such as an image signal converted by the photoelectric converting element 108, and a control signal for controlling the photoelectric converting elements 108 are transmitted and received via a wiring 106 provided in the wiring layer 105. Also, the aperture mask 103 having aperture parts 104 each corresponding to each of the photoelectric converting elements 108 is provided contacting the wiring layer 105. As described below the relative positions of the aperture parts 104 are strictly defined by being shifted for each of the corresponding photoelectric converting elements 108. Due to the action of the aperture mask 103 including the aperture parts 104, a parallax is generated in to subject luminous flux received by the photoelectric converting elements 108. The details of the process are described below.

On the other hand, the aperture mask 103 is not included in the photoelectric converting elements 108 that do not generate a parallax. In other words, it can be said that the aperture mask 103 including the aperture part 104 that does not restrict a subject luminous flux incident on a corresponding one of the photoelectric converting elements 108, or transmits an entire effective luminous flux is provided. A parallax is not generated, but the aperture 107 formed by the wiring 106 substantially regulates an incident subject luminous flux; thus, the wiring 106 can be seen as an aperture mask that transmits an entire effective luminous flux that does not generate a parallax. The aperture masks 103 may be arrayed separately and independently corresponding to each of the photoelectric converting elements 108, or the aperture masks 103 may be formed collectively tot the plurality of photoelectric converting elements 108 as in the manufacturing process of the color filter 102.

The color filter 102 is provided on the aperture mask. 103. The color filter 102 is colored to transmit a light in as particular wavelength range to each of the photoelectric converting elements 108, and is each provided corresponding to each of the photoelectric converting elements 108. Two mutually different types of the color filters 102 suffice to output a color image, but three or more types of the color filters 102 are preferably arrayed to output a higher quality color image. For example, as red filter that transmits a light in the red wavelength range, a green filter that transmits a light in the green wavelength range, and a blue filter that transmits a light in the blue wavelength range may be arrayed in a grid. A specific manner of arraying the filters is described below.

The microlens 101 is provided on the color filter 102. The microlens 101 is a condenser lens for guiding as much incident subject luminous fluxes as possible to the photoelectric converting elements 108. The microlens 101 is each provided corresponding to each of the photoelectric converting elements 108. The optical axis of the microlens 101 is preferably shifted to ensure that as much subject luminous fluxes as possible are guided to the photoelectric converting elements 108 while considering a relative positional relationship of the center of the pupil of the image capturing lens 20 with the photoelectric converting elements 108. Furthermore, the arrangement position of the microlens 101 may be adjusted together with the positions of the apertures 104 of the aperture mask 103 to ensure that as much particular subject luminous fluxes that are described below as possible are incident on the photoelectric converting elements 108.

A unit of the aperture mask 103, the color filter 102 and the microlens 101 that are each provided to each of the photoelectric converting elements 108 in this manner is called a pixel. Particularly, a pixel in which the aperture mask 103 to generate a parallax is called a parallax pixel, and a pixel in which the aperture mask 103 to generate a parallax is not provided is called a non-parallax pixel. For Example, when an effective pixel area of the image capturing element 100 is approximately 24 mm×16 mm, the number of pixels is approximately 12 million.

When an image sensor with high light collection efficiency wad photoelectric con version efficiency is used, the microlens 101 may not be provided. Also, when a backside illuminated image sensor is used, the wiring layer 105 is provided on a side opposite to the photoelectric converting elements 108.

The color filter 102 and the aperture mask 103 can be combined in various Manners. When the aperture part 104 of the aperture mask 103 is provided with a color component in the case of FIG. 2(a), the color filter 102 and the aperture mask 103 may be formed integrally. Also, when a particular pixel is specialized to acquire luminance information of a subject, the pixel may not be provided with the corresponding color filter 102. Alternatively, an uncolored, transparent filter may be arrayed to transmit lights in the almost entire visible wavelength range.

When a pixel to acquire luminance information is a parallax pixel, or when a parallax image is output as a monochrome image, the configuration of the image capturing element 120 shown in FIG. 2(b) may be employed. In other words, the screen filter 121 in which the color filter part 122 that serves as a color filter and the aperture mask part 123 having the aperture part 104 are configured integrally may be disposed between the microlens 101 and the wiring layer 105.

The screen filter 121 is colored, for example, blue, green and red at the color filter part 122, and mask portions other than the aperture part 104 are colored black at the aperture mask part 123. The image capturing element 120 provided with the screen filter 121 is, as compared with the image capturing element 100, is more efficient in collecting subject luminous fluxes because the distance between the microlens 101 and the photoelectric converting elements 108 is short.

Figure 3:
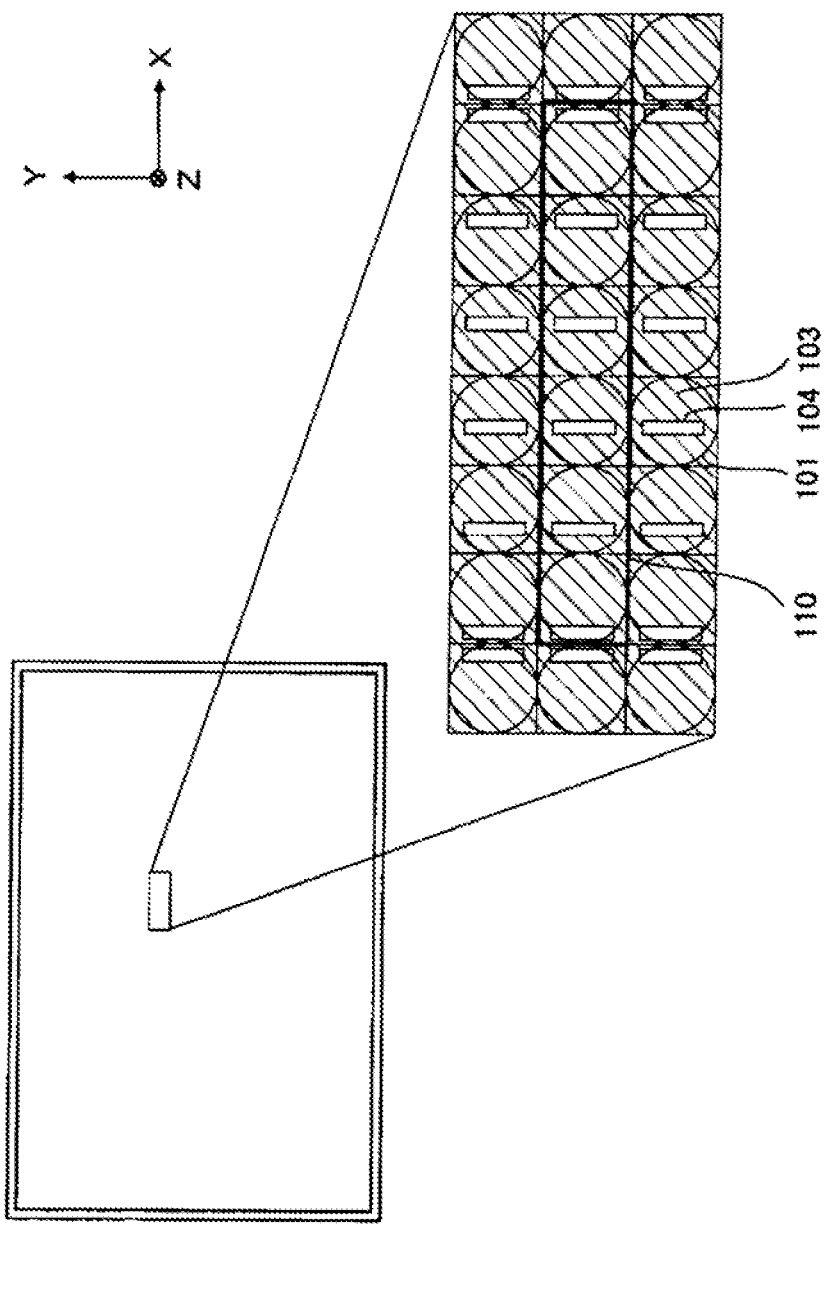
FIG. 3 is a schematic diagram of an expanded part of the image capturing element.

Next, a relationship between the aperture part 104 of the aperture mask 103 and a parallax to be generated is explained. FIG. 3 is a schematic diagram of an expanded part of the image capturing element 100. Here, for simplicity of explanation, the color scheme of the color filter 102 is not considered until it is mentioned again below. By not considering the color scheme of the color filter 102, the image capturing element 100 can be seen as an image sensor provided only with parallax pixels having the color filters 102 of the same color. Accordingly, a repetitive pattern explained below may be seen as adjacent pixels in the color filters 102 of the same color.

As shown in FIG. 3, the aperture parts 104 of the aperture masks 103 are relatively shifted for each pixel. In addition, the aperture parts 104 are displaced from one another in the adjacent pixels.

In the example shown in FIG. 3, six types of the aperture mask 103 in which the positions of the aperture parts 104 for each pixel are shifted horizontally from one another are provided. Groups of photoelectric converting elements, each group consisting of a set of six parallax pixels each having the aperture mask 103 in which the aperture parts 104 are shifted gradually from left to right on the sheet are arrayed two-dimensionally and periodically throughout the image capturing element 100. That is, the image capturing element 100 is configured With the repetitive pattern 110 including a group of the photoelectric converting elements that is spread throughout the image capturing element 100 periodically.

Figure 4:
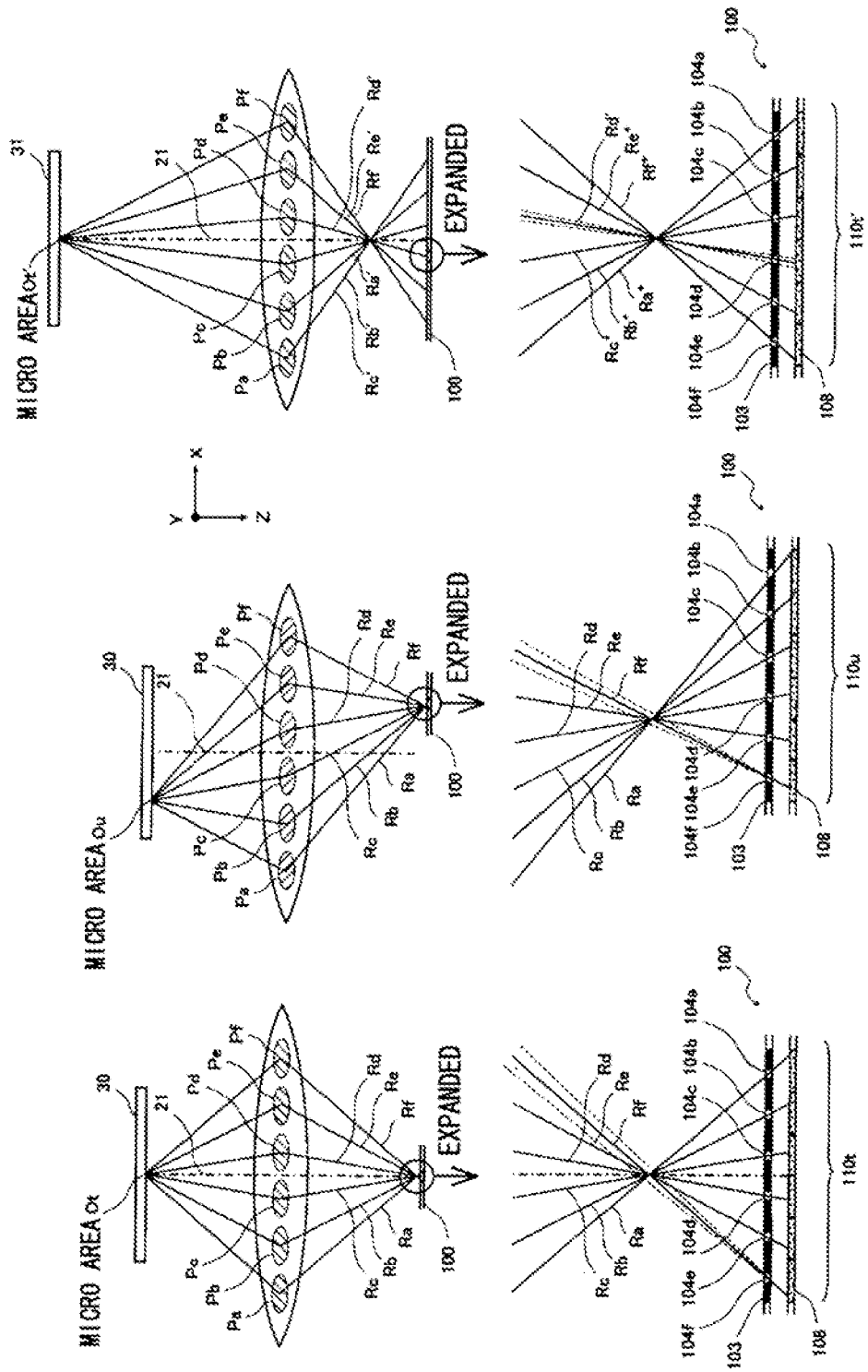
FIGS. 4(a) to 4(c) are conceptual diagrams for explaining a relationship between a parallax pixel and a subject.

FIGS. 4(a) to 4(c) are conceptual diagrams for explaining a relationship between a parallax pixel and a subject. In particular, FIG. 4(a) schematically shows as group of photoelectric converting elements of a repetitive pattern 110t that are arrayed at the center of the image capturing optical axis 21 on a plane that is orthogonal to the image capturing optical axis 21 in the image capturing element 100, and FIG. 4(b) schematically shows a group of photoelectric converting elements with a repetitive pattern 110u that are arrayed at a peripheral portion of the image capturing optical axis 21. A subject 30 in FIGS. 4(a) and 4(b) is located at the focus position of the image capturing lens 20. FIG. 4(c) schematically shows a relationship in a case corresponding to that of FIG. 4(a), that an image of a subject 31 that is located at a non-focus position of the image capturing lens 20 is captured.

First, a relationship between a parallax pixel and a subject when the image capturing lens 20 captures a focused image of the subject 30 is explained. A subject luminous flux passes the pupil of the image capturing lens 20 to be guided to the image capturing element 100. Six partial areas Pa to Pf are defined on an entire cross-sectional area through which the subject luminous flux passes. For example, as regards a pixel that is located leftmost on the sheet in the groups of photoelectric converting elements that configure the repetitive patterns 110t, 110u, the position of an aperture part 104f of the aperture mask 103 is defined such that only a subject luminous flux that is injected from the partial area Pf reaches the photoelectric converting element 108, as can be known from an enlarged view. Likewise, toward the rightmost pixel, the positions of an aperture part 104e, an aperture part 104d, an aperture part 104c, an aperture part 104b and an aperture part 104a are defined to correspond to the partial area Pe, the partial area Pd, the partial area Pc, the partial area Pb and the partial area Pa, respectively.

In other words, for example, the position of the aperture part 104f is defined by an inclination of a principal ray Rf of the subject luminous flux that is injected from the partial area Pf, the inclination being defined by a relative positional relationship between the partial area Pf and the leftmost pixel. When the photoelectric converting element 108 receives, via the aperture part 104f, the subject luminous flux from the subject 30 that is located at the focus position, an image of the subject luminous flux is formed on the photoelectric converting elements 108 as shown with a dotted line. Likewise, toward the rightmost pixel, the positions of the aperture part 104e, the aperture part 104d, the aperture part 104c, the aperture part 104b and the aperture part 104a are defined by inclinations of a principal ray Re, a principal ray Rd, a principal ray Rc, a principal ray Rb and a principal ray Ra, respectively.

As shown in FIG. 4(a), a luminous flux radiated from a micro area of that intersects with the optical axis 21 on the subject 30, which is located at the focus position, passes the pupil of the image capturing lens 20 and reaches each pixel of the group of the photoelectric converting elements that configure the repetitive pattern 110t. That is, each pixel of the group of the photoelectric converting elements that configure the repetitive pattern 110t receives a luminous flux radiated from the single micro area Ot via a corresponding one of the six partial areas Pa to Pf. Although the micro area Ot has an area that corresponds to a positional shift of each pixel of the group of the photoelectric converting elements that configure the repetitive pattern 110t, the micro area Ot can be substantially treated as a single object point. Likewise, as shown in FIG. 4(b), a luminous flux radiated from a micro area Ou that is apart from the optical axis 21 on the subject 30, which is located at the focus position, passes the pupil of the image capturing lens 20 and reaches each pixel of the group of the photoelectric converting elements that configure the repetitive pattern 110u. That is, each pixel of the group of the photoelectric converting elements that configure the repetitive pattern 110u receives a luminous flux radiated from the single micro area Ou via a corresponding one of the six partial areas Pa to Pf. Although the micro area Ou has an area corresponding to a positional shift of each pixel of the group of the photoelectric converting elements that configure the repetitive pattern 110u, the micro area Ou can be substantially treated as a single object point, like the micro area Ot.

That is, as long as the subject 30 is located at the focus position, a micro area captured by the group of the photoelectric converting elements differs depending on the position of the repetitive pattern 110 on the image capturing element 100, and each pixel that configures the group of the photoelectric converting elements captures an image of the same micro area via different partial areas. At each of the repetitive pattern 110, corresponding pixels receive a subject luminous flux from the same partial area. That is, in FIGS. 4(a) to 4(c), the leftmost pixels of, for example, the repetitive patterns 110t, 110u each receive a subject luminous flux from the same partial area Pf.

The position of the aperture part 104f through which the leftmost pixel receives the subject luminous flux from the partial area Pf in the repetitive pattern 110t that is arrayed at the center of the image capturing optical axis 21 on a plane that is orthogonal to the image capturing optical axis 21 is strictly different from the position of the aperture part 104f through which the leftmost pixel receives the subject luminous flux from the partial area Pf in the repetitive pattern 110u arrayed at a peripheral portion of the image capturing optical axis 21. However, in terms of functionality, the aperture parts can be treated as the same type of aperture masks because they are both for receiving a subject luminous flux from the partial area Pf. Accordingly, in the example of FIGS. 4(a) to 4(c), each of the parallax pixels arrayed on the image capturing element 100 has any of the six types of the aperture masks.

Next, the relationship between a parallax pixel and a subject when the image capturing lens 20 captures an unfocused image of the subject 31 is explained. In this case also, the subject luminous flux from the subject 31 that is located at the non-focus position passes the six partial areas Pa to Pf of the pupil of the image capturing lens 20 and reaches the image capturing element 100. It should be noted that the image of the subject luminous flux from the subject 31 that is located at the non-focus position is formed at a position not on the photoelectric converting elements 108. For example, as shown in FIG. 4(c), when the subject 31 is located farther from the image capturing element 100 than the subject 30 is, the image of the subject luminous flux is formed on a side of the photoelectric converting elements 108 closer to the subject 31. On the contrary, when the subject 31 is located closer to the image capturing element 100 than the subject 30 is, the image of the subject luminous flux is formed at a position on a side of the photoelectric converting elements 108 opposite to the subject 31.

Accordingly, the subject luminous flux radiated from a micro area Ot' of the subject 31 that is located at the non-focus position reaches a corresponding pixel in a different set of the repetitive pattern 110 after passing any of the six partial areas Pa to Pf. For example, as shown in an enlarged view of FIG. 4(c), the subject luminous flux that has passed the partial area Pd is incident, as a principal ray Rd', on the photoelectric converting element 108 having the aperture part 104d included in the repetitive pattern 110t'. A subject luminous flux that has been radiated from the micro area Ot' but has passed another partial area is not incident on the photoelectric converting element 108 included in the repetitive pattern 110t', but is incident on the photoelectric converting element 108 having as corresponding aperture part in another repetitive pattern. In other words, fluxes that reach the photoelectric converting element 108 that configure the repetitive pattern 110t' are subject luminous fluxes radiated from mutually different micro areas of the subject 31. That is, although a subject luminous flux with the principal ray Rd' is incident on the photoelectric converting element 108 corresponding to the aperture part 104d, and subject luminous fluxes with principal rays $Ra^+$, $Rb^+$, $Rc^+$, $Re^+$, $Rf^+$ are incident on the photoelectric converting, elements 108 corresponding to other aperture parts, these subject luminous fluxes are radiated from mutually different micro areas of the subject 31. Such a relationship applies also to the repetitive pattern 110u arrayed at a peripheral portion, shown in FIG. 4(b).

This means in the image capturing element 100 as a whole, for example, a subject image A captured by the photoelectric converting element 108 corresponding to the aperture part 104a and a subject image D captured by the photoelectric converting element 108 corresponding to the aperture part 104d are not mutually shifted when they are images of a subject located at a focus position, and are mutually shifted when they are images of a subject located at a non-focus position. The direction and degree of the shift are defined by on which side and to what extent the subject located at the non-focus position is shifted from the focus position, and the distance between the partial area Pa and the partial area Pd. That is, the subject image A and the subject image D are mutually parallax images. This relationship applies also to other aperture parts, and six parallax images are formed corresponding to the aperture parts 104a to 104f.

Accordingly, outputs of mutually corresponding pixels from the repetitive pattern 110 configured in this manner collectively form a parallax image. That is, outputs of pixels that have received subject luminous fluxes injected from specific partial areas of the six partial areas Pa to Pf form a parallax image.

Figure 5:
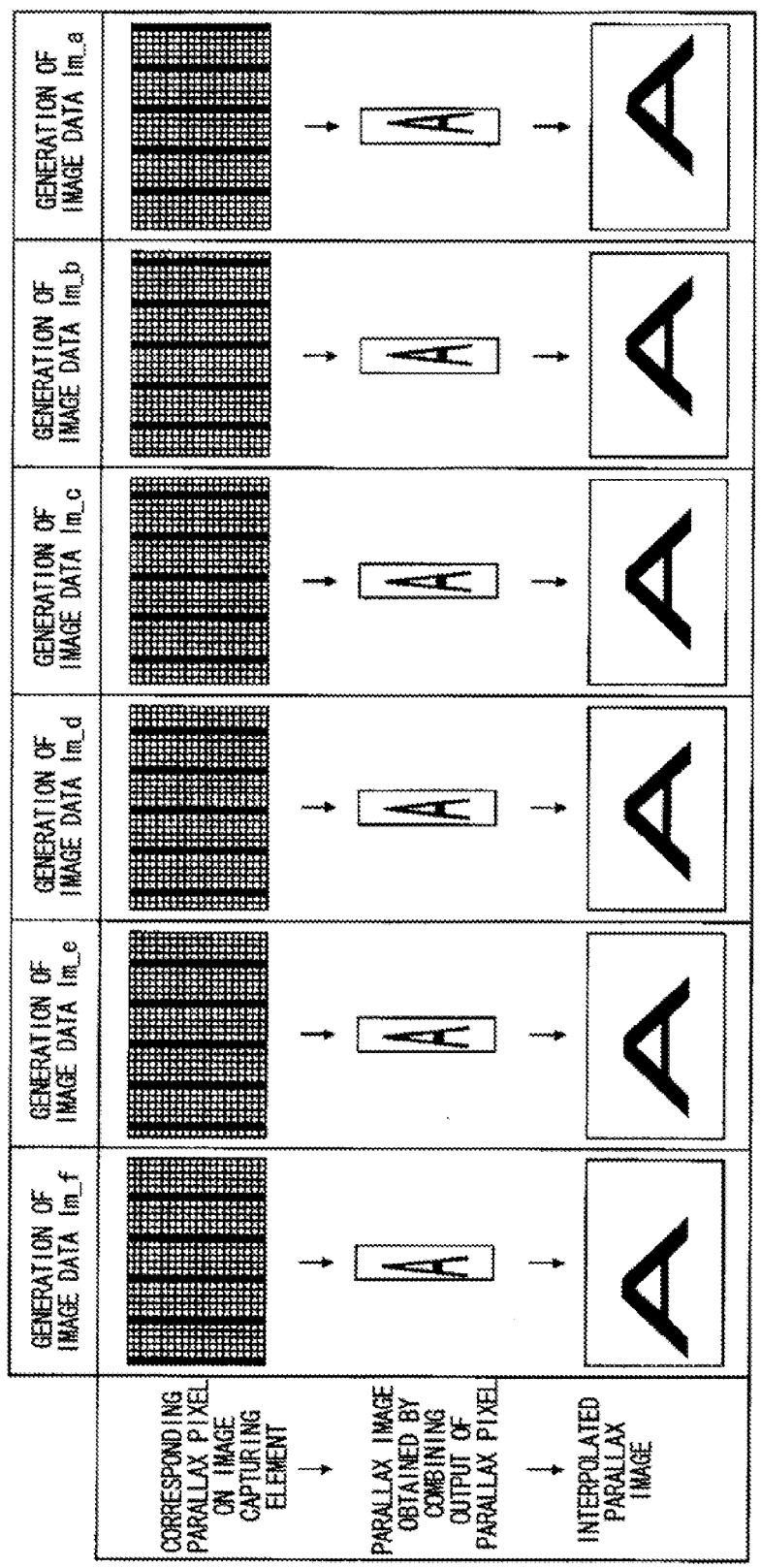
FIG. 5 is a conceptual diagram for explaining a process to generate a parallax image.

FIG. 5 is a conceptual diagram for explaining a process to generate a parallax Image. FIG. 5 shows, starting from the leftmost column: generation of parallax image data Im_f by combining outputs of parallax pixels corresponding to the aperture part 104f; generation of parallax image data Im_e by combining outputs of parallax pixels corresponding to the aperture part 104e; generation of parallax image data Im_d by combining outputs of parallax pixels corresponding to the aperture part 104d; generation of parallax image data Im_c by combining outputs of parallax pixels corresponding to the aperture part 104c; generation of parallax image data Im_b by combining outputs of parallax pixels corresponding to the aperture part 104b; and generation of parallax image data Im_a by combining outputs of parallax pixels corresponding to the aperture part 104a. First, generation of the parallax image data Im_f from the outputs of the aperture part 104f is explained.

The repetitive pattern 110 including the groups of the photoelectric converting elements, each group consisting of a set of the six parallax pixels, is arrayed in a horizontal row. Accordingly, in the image capturing element 100, a parallax pixel having the aperture part 104f is located every six pixels horizontally, and continuously vertically. Each of the pixels receives a subject luminous flux from a mutually different micro area as described above. Accordingly, a parallax image is obtained by combining and arraying outputs from the parallax pixels.

However, because each pixel of the image capturing element 100 in the present embodiment is as squire pixel, simply combining the outputs provides an image in which the number of pixels is reduced to a sixth horizontally, and generates vertically long image data. To cope with this, by performing interpolation to make the lumber of pixels sixfold horizontally, the parallax image data Im_f can be generated in an original aspect ratio. It should be noted that because the parallax image data before interpolation is an image with the number of pixels reduced to a sixth horizontally, the horizontal resolution is lower than the vertical resolution. That is, the number of generated parallax in data and the improvement of the resolution are in a conflicting relationship.

Likewise, the parallax image data Im_e to the parallax image data Im_a are obtained. That is, the digital camera 10 can generate a parallax image from six perspectives having a horizontal parallax.

Although in the above-described example, the repetitive pattern 110 is arrayed periodically in a horizontal row, the repetitive pattern 110 may be arrayed in different manners.

Figure 6B:
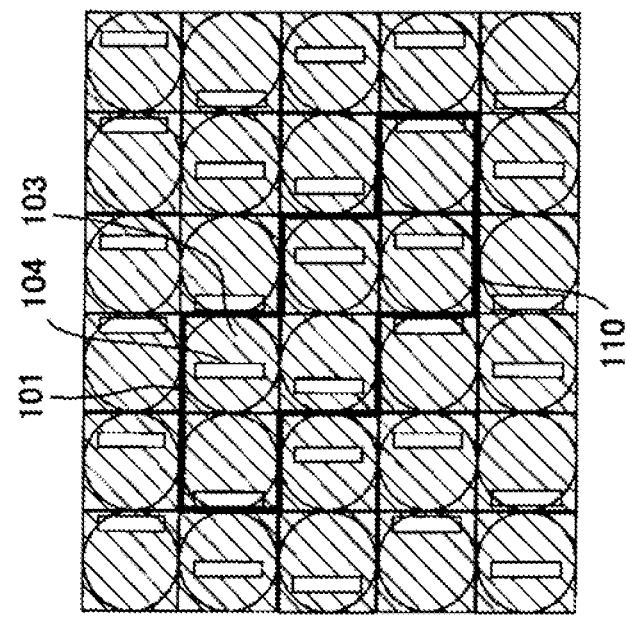
FIGS. 6(a) and 6(b) are diagrams that show other examples of a repetitive pattern.
Figure 6A:
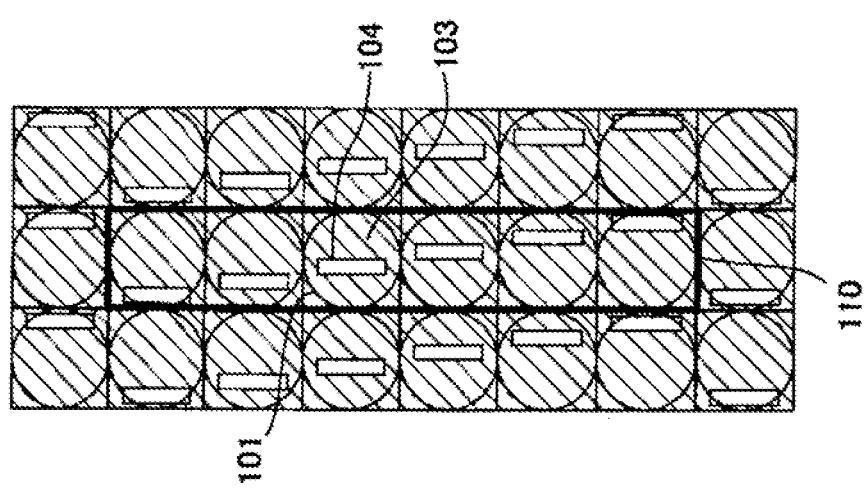

FIGS. 6(a) and 6(b) are diagrams that show other examples of the repetitive pattern 110.

FIG. 6(a) shows an example of the repetitive pattern 110 in which six pixels are arrayed vertically. It should be noted that the position of each of the aperture parts 104 is defined to shift gradually from left to right on the sheet from the uppermost parallax pixel to the lowermost parallax pixel on the sheet. A parallax image from six perspectives that gives a horizontal parallax can be generated by the repetitive pattern 110 arrayed in this manner. In this case, in comparison with the repetitive pattern 110 shown in FIG. 3, the repetitive pattern 110 maintains the horizontal resolution while sacrificing the vertical resolution.

FIG. 6(b) shows an example of the repetitive pattern 110 in which six pixels are arrayed diagonally. The position of each of the aperture parts 104 is defined to shift gradually from left to right on the sheet from the upper left parallax pixel to the lower right parallax pixel on the sheet. A parallax image from six perspectives that gives a horizontal parallax can be generated by the repetitive pattern 110 arrayed in this manner. In this case, in comparison with the repetitive pattern 110 shown in FIG. 3, the repetitive pattern 110 maintains the vertical and horizontal resolution to some extent and at the same time increases the number of parallax images.

Differences among the repetitive patterns 110 shown in FIGS. 3(a) to (c), 6(a) and 6(b) reside in, when a parallax image from six perspectives is generated, whether the vertical resolution, the horizontal resolution or both is/are sacrificed, as compared with the resolution obtained when an image is output from an entire non-parallax image. In the case of the repetitive pattern 110 shown in FIGS. 3(a) to (c), the horizontal resolution is a sixth. In the case of the repetitive pattern 110 shown in FIG. 6(a), the vertical resolution is a sixth. Also, in the case of the repetitive pattern 110 shown in FIG. 6(b), the vertical resolution is a third, and the horizontal resolution is a half. In either case, a single one of the aperture parts 104a to 104f is provided corresponding to each pixel in a single pattern, and each of the aperture parts 104a to 104f receives a subject luminous flux from a corresponding one of the partial areas Pa to Pf. Accordingly, the amount of disparity is similar with use of any of the repetitive pattern 110.

Figure 7:
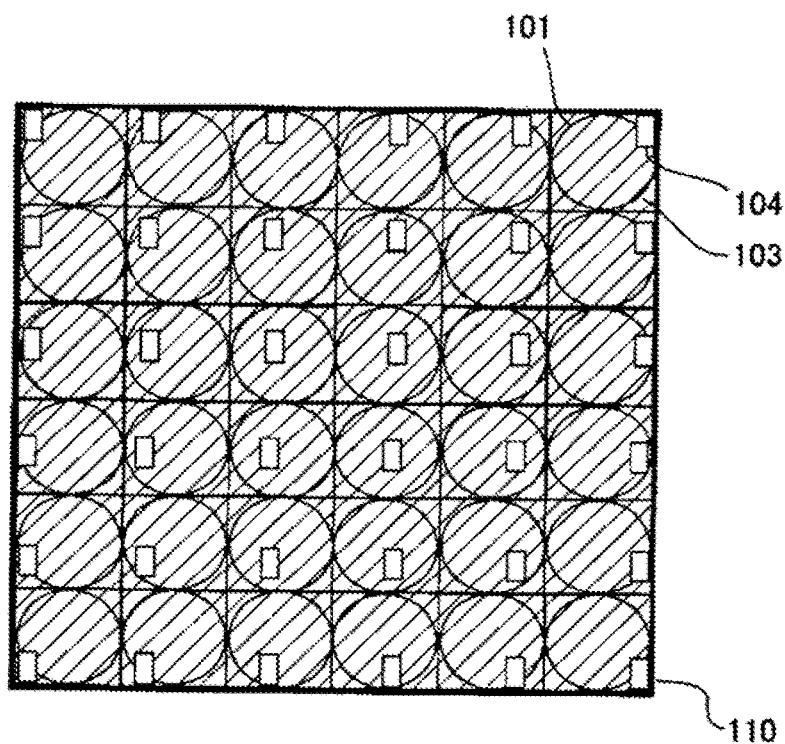
FIG. 7 is a diagram that shows an exemplary two-dimensional repetitive pattern.

Although in the above-described case, a parallax image that gives a horizontal parallax is explained, a parallax image that gives a vertical parallax can also be generated, and a parallax image that gives a parallax two-dimensionally vertically and horizontally can also be generated. FIG. 7 is a diagram that shows an example of the two-dimensional repetitive pattern 110.

In the example shown in FIG. 7, the repetitive pattern 110 is formed with the groups of the photoelectric converting elements, each group consisting of a set of 36 pixels (six pixels vertically×six pixels horizontally). The 36 types of the aperture masks 103 in which the position of the aperture pan 104 of each pixel is shifted from one another vertically and horizontally are prepared. Specifically, the position of each of the aperture part 104 is shifted gradually from top to bottom from the uppermost pixel to the lowermost pixel of the repetitive pattern 110, and at the same time, shifted gradually from left to right from the leftmost pixel to the rightmost pixel.

The image capturing element 100 having the repetitive pattern 110 can output a parallax image from 36 perspectives that gives a vertical and horizontal parallax. Of course, without being limited to the example of FIG. 7, the repetitive pattern 110 can be defined such that parallax images with various numbers of perspectives are output.

In the above explanation, a rectangle is employed as the shape of the aperture part 104. In particular, in the array that gives a horizontal parallax, the amount of light to be guided to the photoelectric converting elements 108 is ensured by making the vertical width of the array in which the parallax pixels are not shifted larger than the horizontal width in which the parallax pixels are shifted. However, the shape of the aperture part 104 is not limited to a rectangle.

Figure 8:
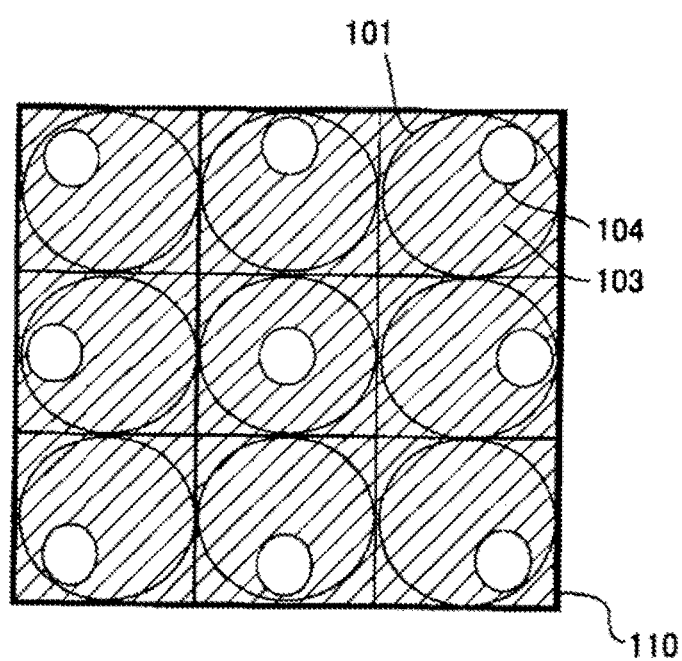
FIG. 8 is a diagram for explaining another shape of an aperture part.

FIG. 8 is a diagram for explaining another shape of the aperture part 104. In FIG. 8, the shape of the aperture part 104 is a circle. When the shape of the aperture part 104 is a circle, an unwanted subject luminous flux can be prevented from being incident on the photoelectric converting elements 108 as a stray light due to a relative relationship with the hemispherical microlens 101.

Figure 9:
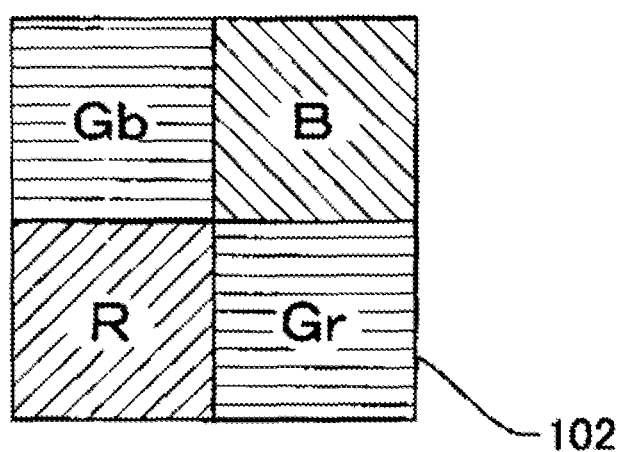
FIG. 9 is a diagram for explaining a Bayer array.

Next, the color filter 102 and a parallax image are explained. FIG. 9 is a diagram for explaining a Bayer array. As shown in FIG. 9, in the Bayer array, green filters are allocated to the two upper left and lower right pixels, a red filter is allocated to a lower left pixel, and a blue filter is allocated to an upper right pixel. Here, the upper left pixel to which the green filter is allocated is referred to as a Gb pixel and the lower right pixel to which the green filter is likewise allocated is referred to as a Gr pixel. Also, the pixel to which the red fitter is allocated is referred to as an R pixel, and the pixel to which the blue filter is allocated is referred to as a B pixel. The horizontal row in which the Gb pixel and the B pixel are arranged is referred to as a Gb row, and the horizontal row in which R pixel and the Gr pixel are arranged is referred to as a Gr row. Also, the vertical column in which the Gb pixel and the R pixel are arranged is referred to as a Gb column, and the vertical column in which the B pixel and the Gr pixel are arranged is referred to as a Gr column.

An enormous number of patterns of the repetitive pattern 110 can be set by allocating parallax pixels and non-parallax pixels in different periodicity to pixels of different colors in the array of the color filter 102. By combining outputs of the non-parallax pixels, non-parallax captured image data like a normal captured image can be generated. Accordingly, by relatively increasing the percentage of the non-parallax pixels, a two-dimensional image with high resolution can be output. In this case, because the percentage at the parallax pixels is relatively low, the quality of a three-dimensional image consisting of as plurality of parallax images deteriorates. On the other hand, by increasing the percentage at the parallax pixels, the quality of a three-dimensional image improves, but the percentage of the non-parallax pixels lowers; as a result, a two-dimensional image with low resolution is output.

Due to such a trade-off relationship, the repetitive pattern 110 having various characteristics can be set depending on which pixels are used as parallax pixels or non-parallax pixels. FIG. 10 is a table for explaining allocation of parallax pixels in the Bayer array in a case that there are two typos of parallax pixels. In this case, the two types of the parallax pixels are assumed to be a parallax L pixel in which the aperture part 104 is off-centered to the left, and as parallax R pixel in which the aperture part 104 is off-centered to the right. That is, a parallax image from two perspectives that is output from such parallax pixels realizes so-called stereopsis.

Explanation of characteristics of each of the repetitive pattern 110 is shown in FIG. 10. For example, when non-parallax pixels are allocated more, two-dimensional image data with high resolution is obtained, and when non-parallax pixels are allocated evenly to each pixel of RGB, two-dimensional image data with less color shift and high image quality can be obtained. When two-dimensional image data is generated by also using outputs of the parallax pixels, a shifted subject image is corrected by referring to outputs of surrounding pixels. Accordingly, for example, even when all the R pixels are parallax pixels, a two-dimensional image can be generated, but the image quality is lowered accordingly.

On the other hand, when the parallax pixel are allocated more, three-dimensional image data with high resolution is obtained, and when the parallax pixel are allocated evenly to each pixel of RGB, high quality color image data that provides a three-dimensional image is obtained. When three-dimensional image data is generated by also using outputs of the non-parallax pixels, a shifted subject image is corrected by referring to outputs of surrounding pixels based on a non-parallax subject image. Accordingly, for example, even when all the R pixels are the non-parallax pixels, a color three-dimensional image can be generated, but the image quality is lowered.

Figure 11:
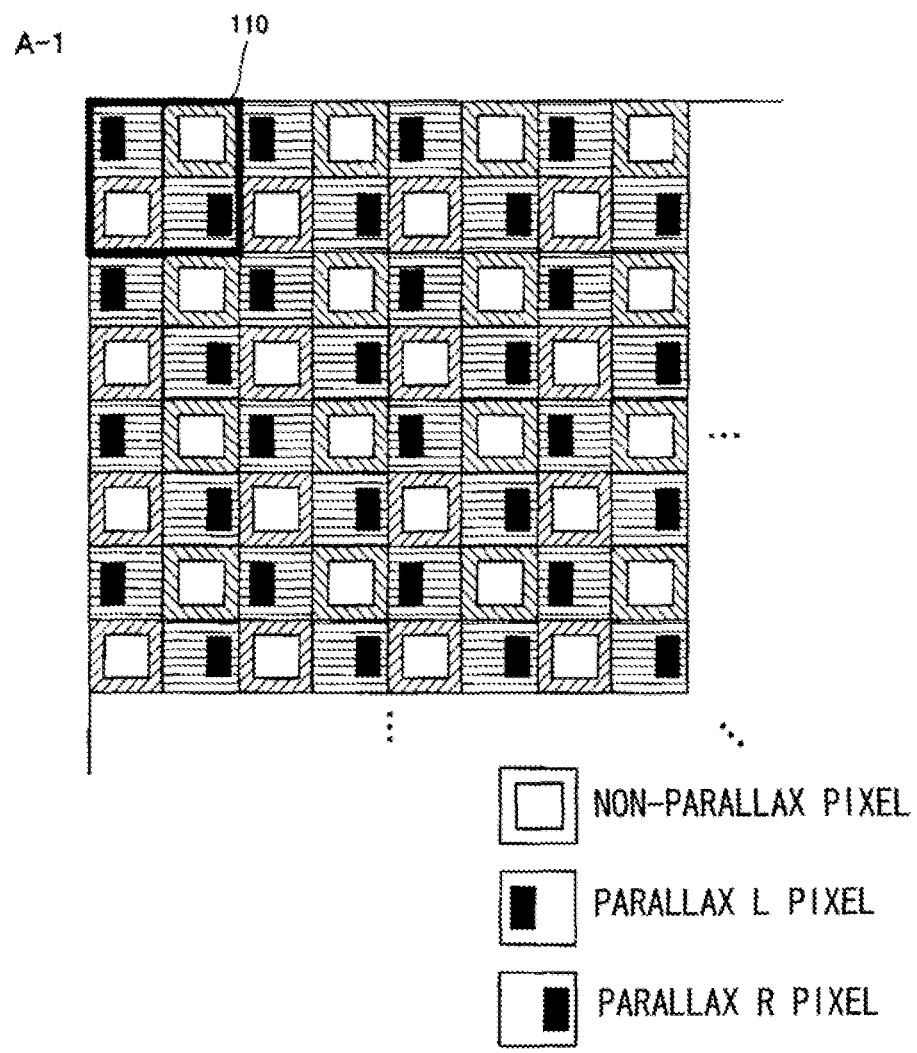
FIG. 11 is a diagram showing an exemplary case.

In the following, several cases are explained. FIG. 11 is a diagram showing an exemplary case. The case shown in FIG. 11 corresponds to a repetitive pattern classification A-1 in FIG. 10.

In the example shown in FIG. 11, four pixels form the repetitive pattern 110 like the Bayer array. The R pixel and the G pixel are non-parallax pixels, the Gb pixel is allocated to the parallax L pixel, and the Gr pixel is allocated to the parallax R pixel. In this case, the aperture part 104 is defined such that the parallax L pixel and the parallax R pixel included in the same repetitive pattern 110 receive a luminous flux radiated from the same micro area when a subject is located at a focus position.

In the example shown in FIG. 11, because the Gb pixel and the Gr pixel that are green pixels with high luminous sensitivity are used as the parallax pixels, a parallax image with high contrast can be expected. Also, because the Gb pixel and the Gr pixel that are both green pixels are used as the parallax pixels, computation to convert outputs of the Gb pixel and the Gr pixel into non-parallax outputs can be easily performed, and two-dimensional image data with high image quality can be generated together with outputs of the R pixel and the B pixel that are the non-parallax pixels.

Figure 12:
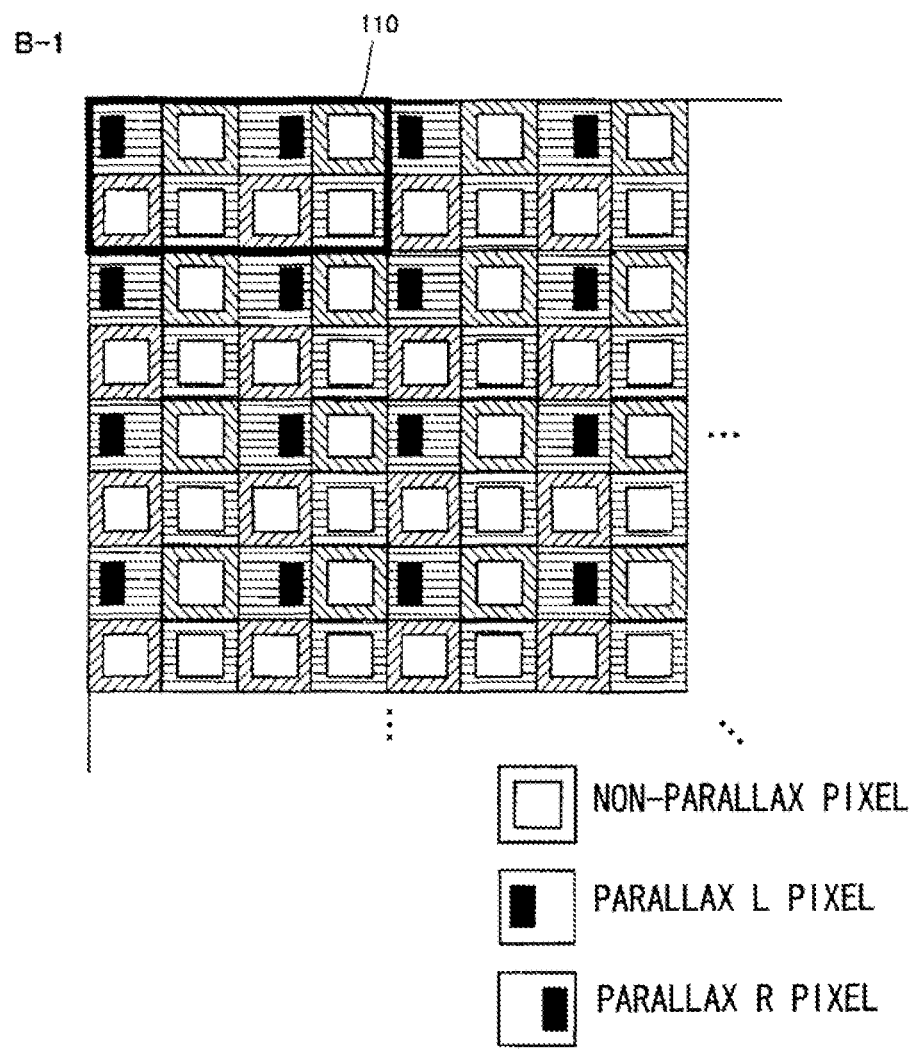
FIG. 12 is a diagram showing another exemplary case.

FIG. 12 is a diagram showing another exemplary case. The case shown in FIG. 12 corresponds to a repetitive pattern classification B-1 shown in FIG. 10.

In the example shown in FIG. 12, two sets of four pixels in the Bayer array are arranged horizontally next to each other, and the eight pixels form the repetitive pattern 110. Among the eight pixels, the left Gb pixel is allocated to the parallax L pixel, and the right Gb pixel is allocated to the parallax R pixel. In such an array, a two-dimensional image with higher image quality, as compared with the example shown in FIG. 10, can be expected because the Gr pixel is the non-parallax pixel.

Figure 13:
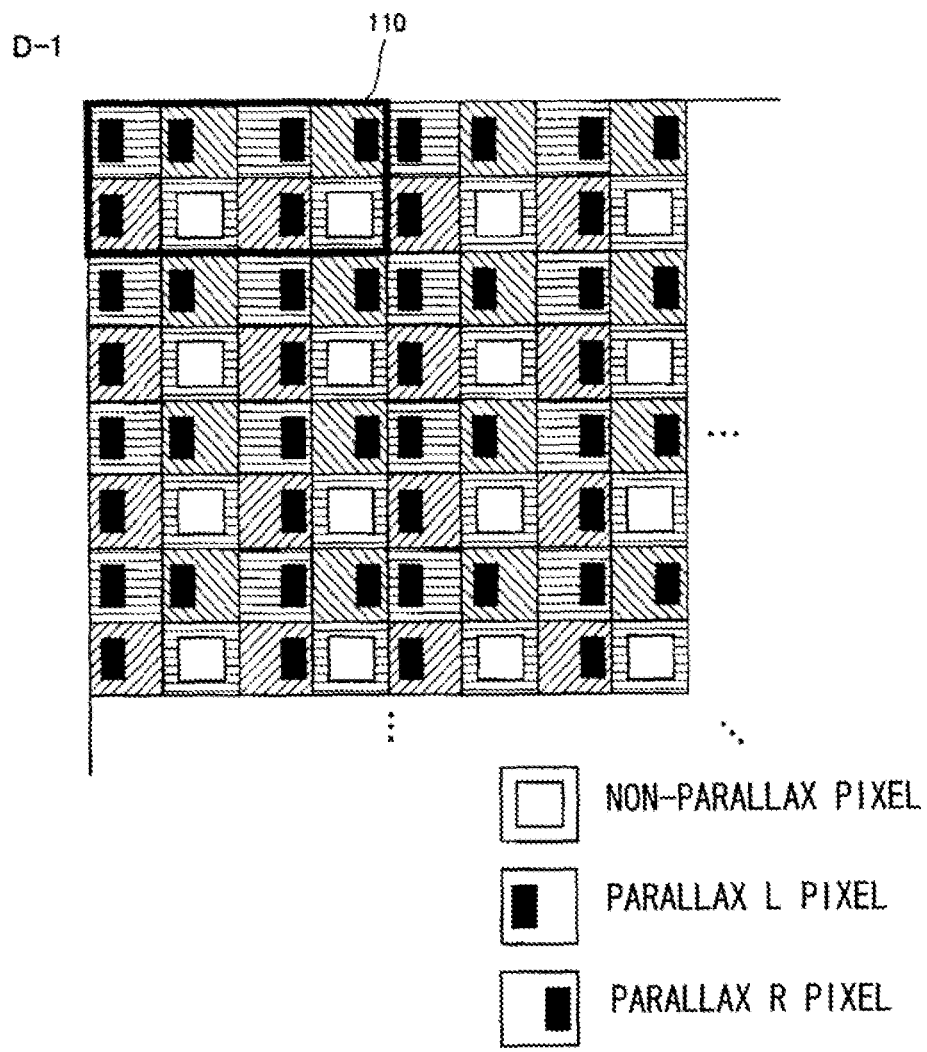
FIG. 13 is a diagram showing another exemplary case.

FIG. 13 is a diagram showing still another exemplary case. The case shown in FIG. 13 corresponds to a repetitive pattern classification shown in FIG. 10.

In the example shown in FIG. 13, two sets of our pixels in the Bayer array are arranged horizontally next to each other, and the eight pixels form the repetitive pattern 110. Among the eight pixels, the left Gb pixel is allocated to the parallax L pixel, and the right Gb pixel is allocated to the parallax R pixel. Furthermore, the left R pixel is allocated to the parallax L pixel, and the right R pixel is allocated to the parallax R pixel. Furthermore, the left B pixel is allocated to the parallax L pixel, and the right B pixel is allocated to the parallax R pixel. The two Gr pixels are allocated to the non-parallax pixels.

The two Gb pixels allocated to the parallax L pixel and the parallax R pixel receive a luminous flux radiated from a single micro area when a subject is located at as focus position. Also, the two R pixels allocated to the parallax L pixel and the parallax R pixel receive a luminous flux radiated from a single micro area that is different from that for the Gb pixels, and the two B pixels allocated to the parallax L pixel and the parallax R pixel receive a luminous flux radiated from a single micro area that is different from those for the Gb pixels and the R pixels. Accordingly, the vertical resolution of a three-dimensional image trebles as compared with the example shown in FIG. 12. In addition, because outputs of three colors, RGB, are obtained, the color three-dimensional image with high quality can be obtained.

Although a parallax image from two perspectives can be obtained by using two types of the parallax pixels as described above, various numbers of types of the parallax pixels as explained with reference to FIGS. 3(a) to 3(c), 7 and 8 can be employed in accordance with the number of parallax images that are desired to be output. Even with as larger number of perspectives, various types of the repetitive pattern 110 can be formed. Accordingly, the repetitive pattern 110 can be selectively used in accordance with specifications and purposes.

Although in the above-described example, the Bayer array is employed as a color filter array, other color filter arrays can of course be employed. As explained with reference to FIGS. 3(a) to 3(c) and other figures, it suffices that parallax pixels be allocated such that a repetitive pattern is formed with groups of photoelectric converting elements, each group consisting of a set of a plurality of adjacent pixels, and a parallax image is output when an attention is paid to a single color that configures the color filter array and outputs of the color are combined. At this time, each of the parallax pixels that configure a group of the photoelectric converting elements preferably includes the aperture mask 103 having the aperture part 104 oriented to a mutually different partial area.

Accordingly, the image capturing element 100 includes the two-dimensionally arrayed photoelectric converting elements 108 that convert an incident light into an electrical signal, the aperture mask 103 each provided to each of at least some of the photoelectric converting elements 108, and the color filter 102 each provided corresponding to each of the at least some of the photoelectric converting elements 108. The aperture part 104 of each of the aperture mask 103 provided corresponding to at least three of the n (n is an integer equal to or larger than three) adjacent photoelectric converting elements 108 is included in a single color filter pattern configured with at least two types of the color filter 102 that transmits a light in a mutually different wavelength range, and is positioned to transmit a luminous flux from a mutually different partial area in a cross-sectional area of an incident light, and groups of the photoelectric converting elements, each group consisting of a set of the n photoelectric converting elements 108, are arrayed periodically.

Figure 14:
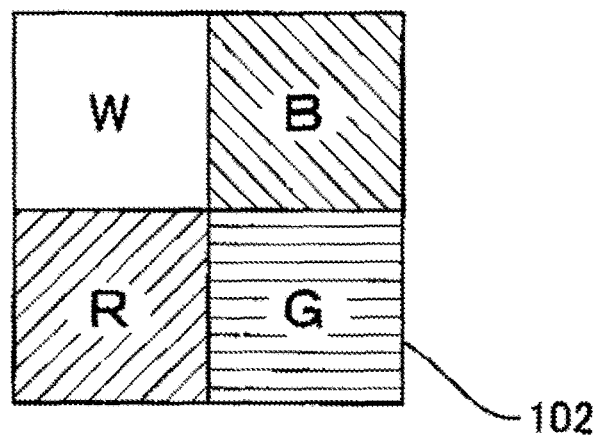
FIG. 14 is a diagram for explaining another color filter array.

FIG. 14 is a diagram for explaining another color filter array. As shown in FIG. 14, the color filter array is different from the Bayer array shown in FIG. 9 in that, while the Gr pixel is maintained as the G pixel to which a green filter is allocated, the Gb pixel is changed to the W pixel to which a color filter is not allocated. An uncolored transparent filter may be arrayed in the W pixel as described above to transmit lights in the almost entire visible wavelength range.

By employing such a color filter array including the W pixel, although the accuracy of color information output by the image capturing element deteriorates slightly, the amount of light received by the W pixel increases as compared with a case that a color filter is provided; as a result, highly accurate luminance information can be acquired. By combining outputs of the W pixel, a monochrome image can be formed.

In the case of a color filter array including the W pixel, other cases for the repetitive pattern 110 of the parallax pixels and the non-parallax pixel are conceivable. For example, a subject image with high contrast can be obtained even when the image is captured in a relatively dark environment, if the image is output from the W pixel, as compared with an image output from a color pixel. By allocating the W pixel to the parallax image, a highly accurate computation result can be expected in a matching process performed among a plurality of parallax images. The matching process is executed as one of the processes to acquire distance information on a subject image to be included in image data. Accordingly, the repetitive pattern 110 of the parallax pixels and the non-parallax pixels is set by considering gains and losses of other information to be extracted, in addition to influence on the resolution of a two-dimensional image and the image quality of a parallax image.

Figure 15:
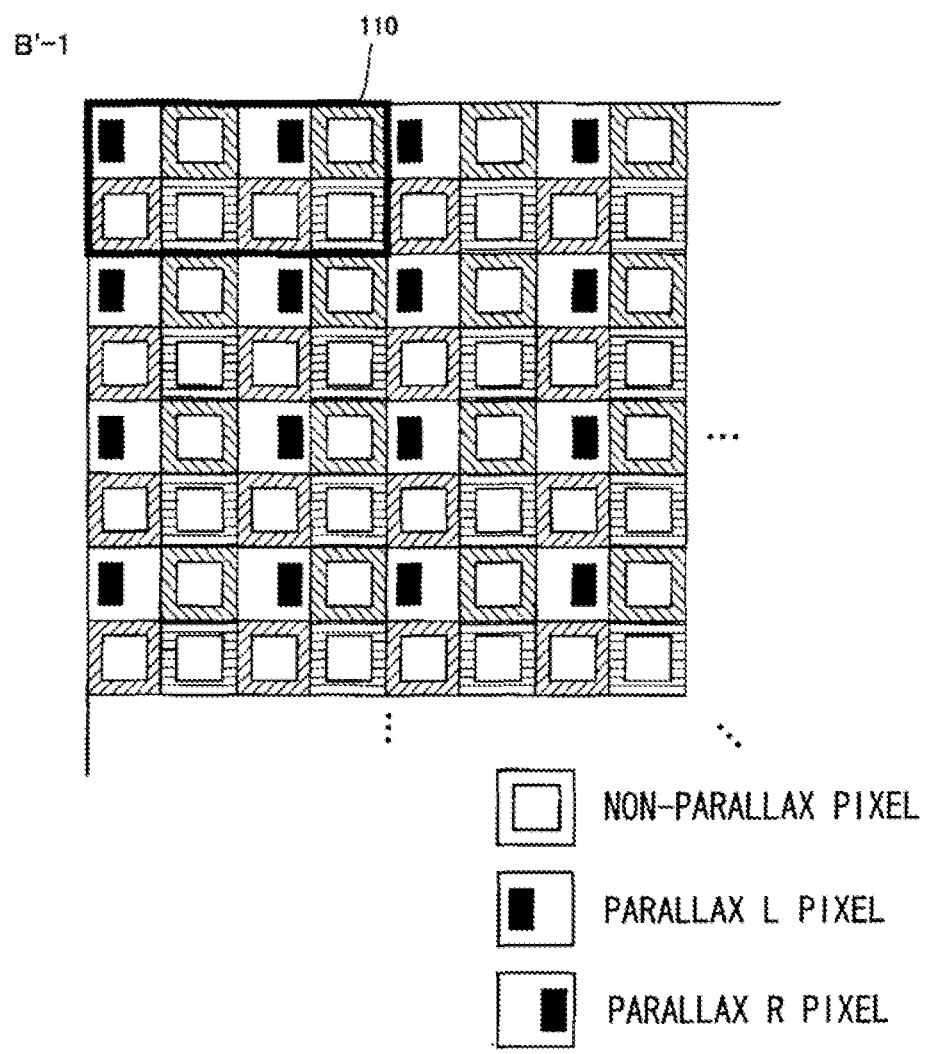
FIG. 15 is a diagram showing an exemplar array of W pixels and parallax pixels.

FIG. 15 is a diagram showing an exemplary array of the W pixel and the parallax pixel when a color filter array different from the color filter array shown in FIG. 14 is employed. Because the case shown in FIG. 15 is similar to the repetitive pattern classification B-1 shown in FIG. 12 in the Bayer array, it is identified as a repetitive pattern classification B'-1. In the example shown in FIG. 15, two different color filter arrays each with four pixels are arranged horizontally next to each other, and the eight pixels form the repetitive pattern 110. Among the eight pixels, the left W pixel is allocated to the parallax L pixel, and the right W pixel is allocated to the parallax R pixel. The image capturing element 100 with such an array outputs a parallax image as a monochrome image and outputs a two-dimensional image as a color image.

In this case, the image capturing element 100 includes the two-dimensionally arrayed photoelectric converting elements 108 that convert an incident light into an electrical signal, the aperture mask 103 each provided to each of at least some of the photoelectric converting elements 108, and the color filter 102 each provided corresponding to each of the at least some of the photoelectric convening elements 108. The aperture part 104 of each of the aperture mask 103 provided corresponding to at least two of the n (n is an integer equal to or larger than four) adjacent photoelectric converting elements 108 is not included in a single color filter pattern configured with at least two types of the color filter 102 that transmits light in a mutually different wavelength range, and is positioned to transmit a luminous flux from a mutually different partial area in a cross-sectional area of an incident light, and groups of the photoelectric converting elements, each group consisting of a set of the n photoelectric converting elements 108, are arrayed periodically.

Figure 16:
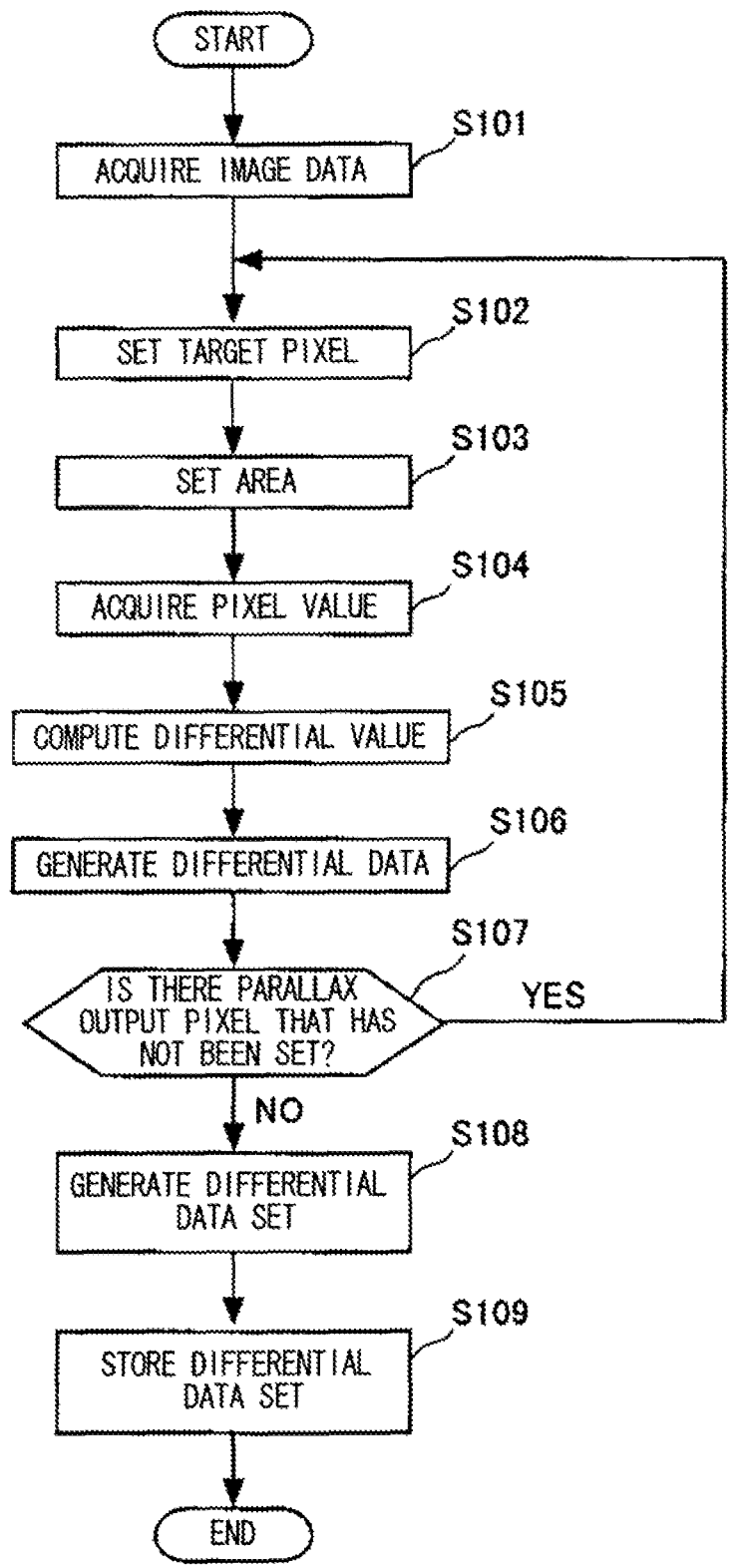
FIG. 16 is a diagram showing a process flow of a differential data set generation process.

FIG. 16 is a diagram showing a process flow of a differential data set generation process in the present embodiment. Here, a differential data set includes differential data in which a differential pixel value that is a differential between a pixel value of a first parallax output pixel and a pixel value of a second parallax output pixel, the first parallax output pixel and the second parallax output pixel being included in a captured image, is associated with a direction of the second parallax output pixel with reference to the first parallax output pixel. Also, the differential data set is formed to include a plurality of pieces of differential data for a plurality of the first parallax output pixels.

For example, an output value of a parallax L pixel oh the image capturing element 100 shown in FIGS. 11 to 13 and 15 described above is a pixel value of the first parallax output pixel at a corresponding position iii a captured image, and an output value of a parallax R pixel is a pixel value of the second parallax output pixel at a corresponding position in the captured image. Then, the differential data set is formed to include the differential data in which the differential pixel value that is a differential between the output value of the parallax L pixel and the output value of the parallax R pixel is associated with the direction of the second parallax output pixel at a position corresponding to the parallax R pixel with reference to the first parallax output pixel at a position corresponding to the parallax L pixel. Then, the differential data set is formed to include a plurality of pieces of the differential data for a plurality of the first parallax output pixels at positions corresponding to a plurality of the parallax L pixels.

By generating such a differential data set, the image processing unit 205 can easily confirm a place where the differential between the pixel value of the first parallax output pixel and the pixel value of the second parallax output pixel in a captured image is large, and the direction of the place. Accordingly, the image processing unit 205 can easily determine the presence or absence of a depth in a subject image in the captured image without necessity for a complicated computation such as the pattern matching process.

The process flow starts when the image capturing element 100 outputs an image signal after finishing, for example, an exposure operation. At the step S101, the image processing unit 205 receives the image signal output from the image capturing element 100 and acquires captured image data.

The captured image has a plurality of the first parallax output pixels and a plurality of the second parallax output pixels arranged at mutually different positions. The arrangement of the plurality of first parallax output pixels and the plurality of second parallax output pixels correspond to a first parallax pixel group and a second parallax pixel group in the image capturing element 100. An output value of each pixel of the first parallax pixel group in the image capturing element 100 is a pixel value of the first parallax output pixel at a corresponding position. An output value of each pixel of the second parallax pixel group in the image capturing element 100 is a pixel value of the second parallax output pixel at a corresponding position. A first parallax image formed based on the arrangement and the pixel values of the plurality of first parallax output pixel and the second parallax image formed based on the arrangement and the output values of the plurality of second parallax output pixels cause a parallax.

Proceeding to the step S102, the image processing unit 205 sets one of the first parallax output pixels of the first parallax image as a target pixel. The target pixel serves as a reference for computation in a differential computation process at the step S106 described below.

At the start of the process, the image processing unit 205 acquires information on the address of a predetermined reference pixel, and sets the reference pixel as a target pixel. The reference pixel serves as a pixel to be a first reference in the differential computation at the step S106, and is at a predetermined position such as the first parallax output pixel at the central part of the captured image or the upper left first parallax output pixel of the captured image. The details of the target pixel setting process are described below.

Proceeding to the step S103, the image processing unit 205 treats a pixel at the central part as the target pixel and an m×n (m and n are integers equal to or larger than three) pixel area including the plurality of second parallax output pixels of the second parallax image as a target area. The details of the area setting process are described below. Then, at the step S104, the image processing unit 205 acquires, from the captured image data, pixel values of the target pixel and the plurality of second parallax output pixels included in the target area.

Proceeding to the step S105, the differential computing unit 231 of the image processing unit 205 computes the differential pixel value that is a differential between the pixel value of the target pixel and the pixel value of each of the plurality of second parallax output pixels included in the target area. Then, at the step S106, the data generating unit 232 of the image processing unit 205 generates the differential data in which the direction of each of the plurality of second parallax output pixels with reference to the target pixel is associated with the corresponding differential pixel value, and stores the generated differential data in the memory 203 temporally. The differential computation process and the differential data generation process are described below.

Proceeding to the step S107, the image processing unit 205 determines whether there is a first parallax output pixel that has not been set as a target pixel. For example, the image processing unit 205 determines that there is a first parallax output pixel that has not been set as a target pixel when there is a first parallax output pixel that has not been set as a target pixel among the first parallax output pixels of the parallax image data. When the image processing unit 205 determines that there is a first parallax output pixel that has not been set as a target pixel, the process returns to the step S102.

When the image processing unit 205 determines that there is not a first parallax output pixel that has not been set as a target pixel, the process proceeds to the step S108. At the step S108 the data generating unit 232 of the image processing unit 205 generates a differential data set using the differential data generated at the step S106. The details of the differential data set generation process are described below. Then, at the step S109, the storage control unit 233 of the image processing unit 205 stores the differential data set generated at the step S108 in the memory card 220 in a file format, and the process flow ends.

Here, a first example using the image capturing element 100 having the pixel array shown in FIG. 11 is explained. FIG. 17 is a diagram for explaining captured image data in the first example. An output value of a parallax L pixel in which the aperture part is off-centered to the left serves as a pixel value of a green left parallax output pixel at a corresponding position. An output value of a parallax R pixel in which the aperture part is off-centered to the right serves as a pixel value of a green right parallax output pixel at a corresponding position. Output values of an R pixel and a B pixel that are non-parallax pixels serve as pixel values of a red non-parallax output pixel and a blue non-parallax output value at corresponding positions.

A left parallax image formed based on the arrangement and the pixel values of a plurality of left parallax output pixels and a right parallax image formed based on the arrangement and the pixel values of a plurality of the right parallax output pixels are parallax images from two perspectives. In the present example, the left parallax output pixel is referred to as a first parallax output pixel and the right parallax output pixel is referred to as a second parallax output pixel. An x-axis and a y-axis corresponding to an x-axis and a y-axis, respectively, of the image capturing element are set in the captured image data. The positive direction of the x axis is the rightward direction, and the positive direction of the y-axis is the upward direction.

Figure 18:
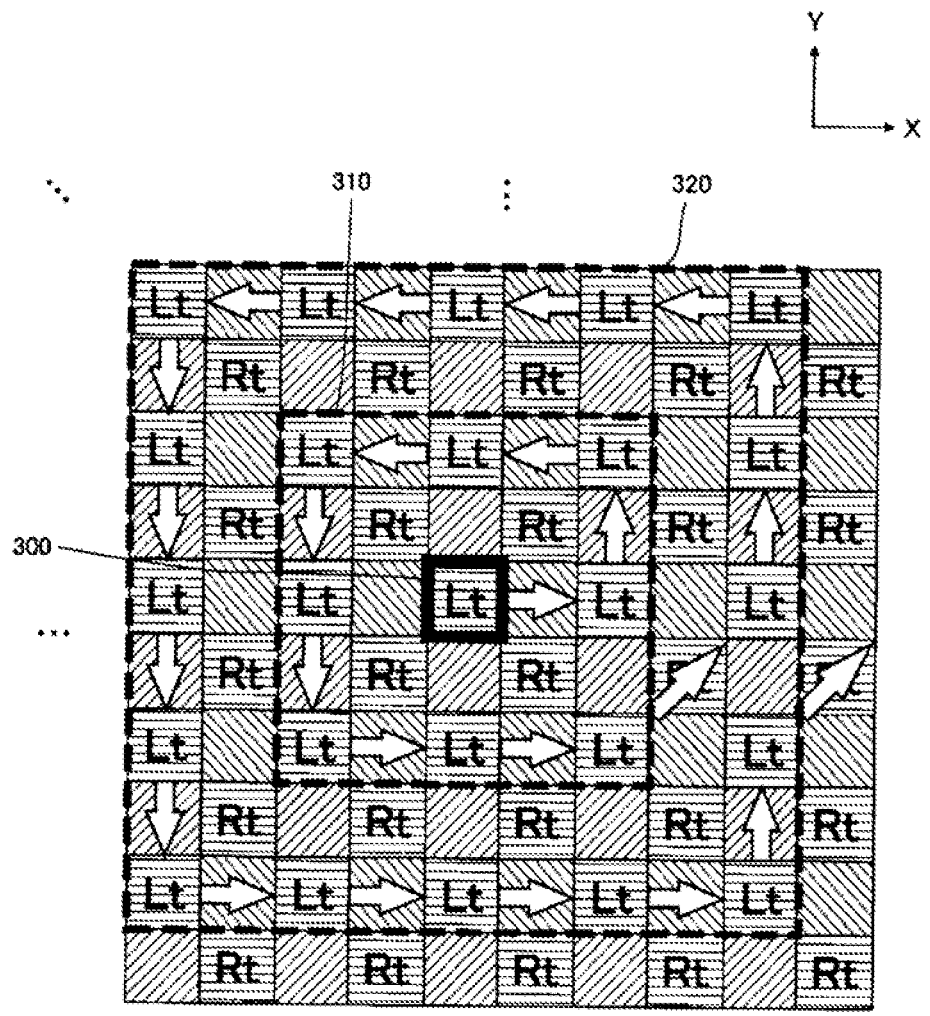
FIG. 18 is a diagram for explaining a target pixel setting process in the first example.
Figure 19:
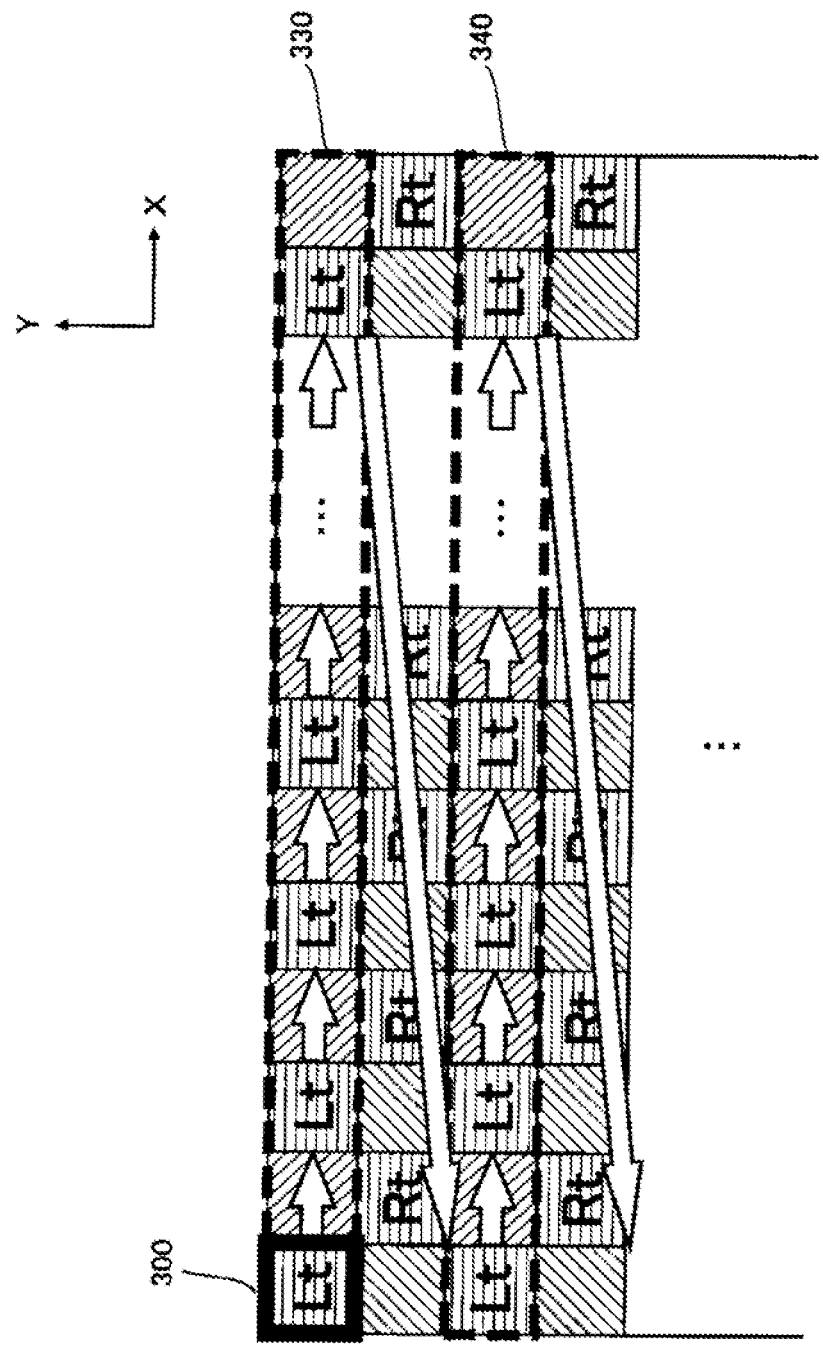
FIG. 19 is a diagram for explaining the target pixel setting process in the first example.

FIGS. 18 and 19 are diagrams for explaining a target pixel setting process in the first example. FIG. 18 is a diagram for explaining the target pixel setting process when the reference pixel is a left parallax output pixel at the central part of the captured image data. First, at the start of the process, the image processing unit 205 sets the reference pixel 300 as is target pixel, and generates differential data.

Next, the image processing unit 205 sets an area 310 including left parallax output pixels that are positioned closest to the reference pixel 300 (a left parallax output pixel that is two pixels away from the reference pixel 300) and excluding the reference pixel. Then, the image processing unit 205 sets the left parallax output pixels in the area 310 as target pixels sequentially, and generates differential data sequentially. For example, the image processing unit 205 sets the left parallax output pixels in the area 310 as the target pixels sequentially counterclockwise starting from the left parallax output pixel two pixels away rightward (in the positive direction of the x-axis) from the reference pixel 300.

After setting all the left parallax output pixels in the area 310 as the target pixels, the image processing unit 205 sets an area 320 including left parallax output pixels outside the area 310 and closest to the reference pixel 300 (left parallax output pixels that are four pixels away from the reference pixel 300) and excluding the reference pixel and the area 310. Then, the image processing unit 205 sets the left parallax output pixels in the area 320 as target pixels sequentially, and generate differential data sequentially. For example, the image processing unit 205 sets the left parallax output pixels in the area 310 as the target pixels sequentially counterclockwise starting from the left parallax output pixel four pixels away rightward (in the positive direction of the x-axis) from the reference pixel 300. The image processing unit 205 repeats this process to set the left parallax output pixels as the target pixels from the center to the outward in the captured image data.

By setting the left parallax output pixels as the target pixels from the center to the outward of the captured image in this manner the image processing unit 205 can execute computation of aberration correction concurrently with the above-described differential data generation process. Specifically, because the center of the captured image data corresponds to the center of the optical axis, the image processing unit 205 does not execute the computation of the aberration correction when differential data is generated by setting pixels within a specific range around a reference pixel as target pixels. A range on which aberration correction is assumed not necessary to be performed is preset as the specific range. Thereafter, the image processing unit 205 executes the computation of the aberration correction when differential data is generated by setting pixels outside the specific range as target pixels.

FIG. 19 is a diagram for explaining the target pixel setting process when the reference pixel is an upper left left parallax output pixel of the captured image data. First, at the start of the process, the image processing unit 205 sets the reference pixel 300 as a target pixel and generates differential data. Next, the image processing unit 205 sets a horizontal area 330 with as height of a single pixel including the reference pixel 300. Then, the image processing unit 205 sets left parallax output pick in the horizontal area 330 as target pixels sequentially from left to right (in the positive direction of the x-axis) and generates differential data sequentially.

After setting all the kit parallax output pixels in the horizontal area 330 as target pixels, the image processing unit 205 sets a horizontal area 340 with a height of a single pixel including left parallax output pixels that are located below (in the negative direction in the y-axis) the horizontal area 330 and closest to the horizontal area 330. Then, the image processing unit 205 sets the left parallax output pixels in the horizontal area 340 as target pixels sequentially from left to right (in the positive direction of the x-axis) starting from the leftmost left parallax output pixel in the horizontal area 340 and generates differential data sequentially. The image processing unit 205 repeats this process to set left parallax output pixels as target pixels from top to bottom in the captured image data.

By setting the left parallax output pixel as the target pixels from top to bottom in the captured image, the differential data generation process can be executed concurrently with a process such as the display process of reading out data from top to bottom of the captured image.

Figure 20:
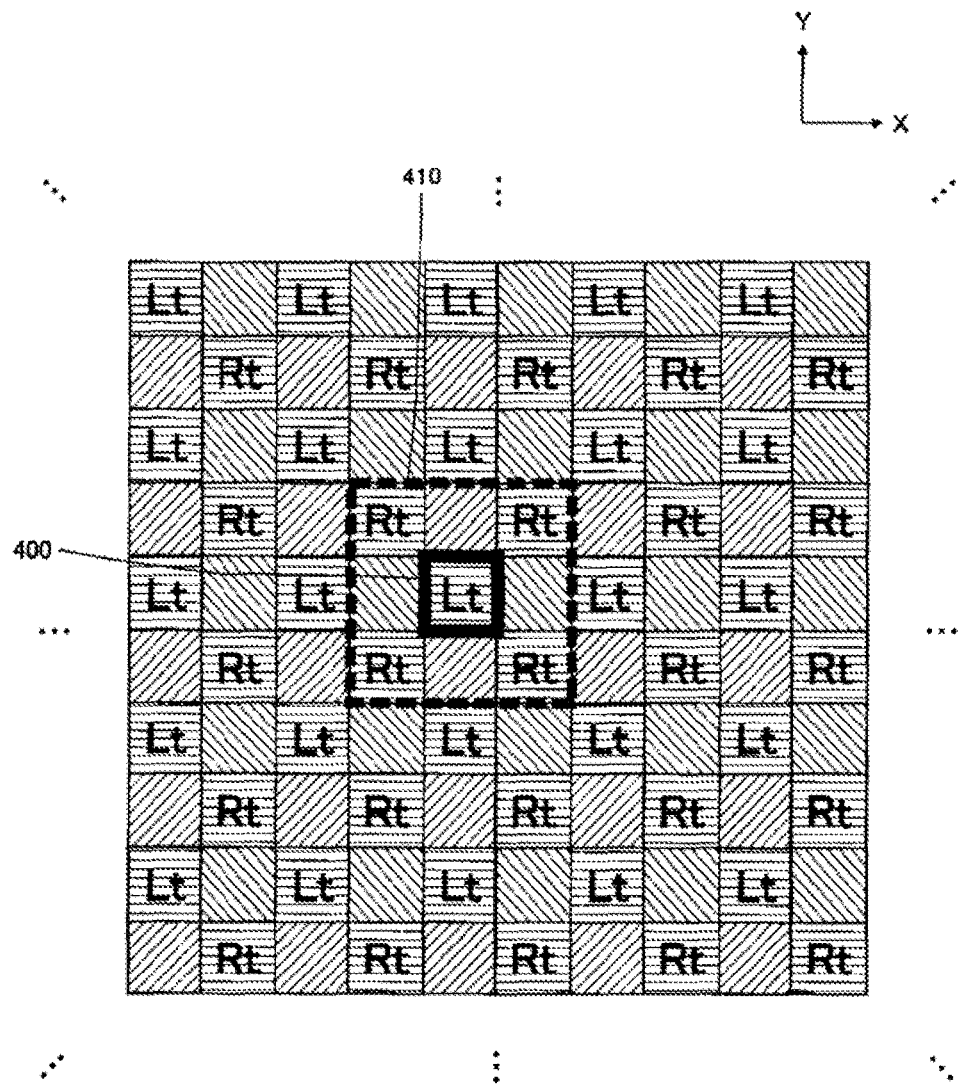
FIG. 20 is a diagram for explaining an area setting process in the first example.

FIG. 20 is a diagram for explaining an area setting process in the first example. The image processing unit 205 sets a target area 410 with m×n pixels including a plurality of right parallax output pixels centered around a target pixel 400. Here, m and n are integers equal to or larger than three. When both m and n are odd numbers, the image processing unit 205 sets the target area 410 with the target pixel 400 at its center. On the other hand, when either or both of m and n is/are an even number(s), the image processing unit 205 sets the target area 410 with the target pixel 400 as the pixel closest to its center.

For example, the image processing unit 205 sets the target area 410 to include at least two right parallax output pixels that are positioned in the two vertical directions, the two horizontal directions or two diagonal directions with reference to the target pixel 400. Also, the image processing unit 205 may set the target area 410 to include at least four right parallax output pixels positioned in the four vertical and horizontal directions, or the four diagonal directions with reference to the target pixel 400. In the present example, the image processing unit 205 sets the target area 410 with 3×3 pixels centered around the target pixel 400 and including four right parallax output pixels positioned in the four diagonal directions.

Figures 21A, 21B:
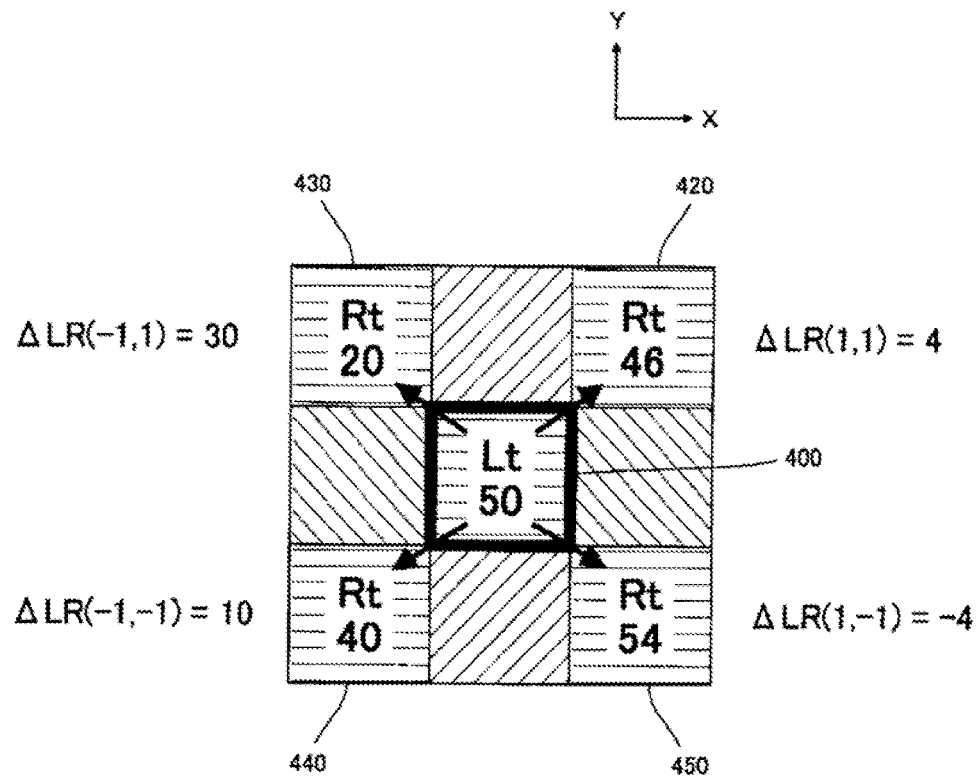
FIG. 21(a) is a diagram for explaining a differential computation process in the first example.
FIG. 21(b) is a table showing exemplary differential data in the first example.

FIG. 21(a) is a diagram for explaining the differential computation process in the first example. The differential computing unit 231 of the image processing unit 205 computes a differential pixel value ΔLR between a pixel value of the target pixel 400 and the pixel value of each of four right parallax output pixels 420, 430, 440, 450 included in the target area 410. The differential computing unit 231 obtains a value of (the pixel value of the target pixel)−(the pixel value of the right parallax output pixel) as the differential pixel value ΔLR. Specifically, the differential computing unit 231 performs computation of (the pixel value of the target pixel 400, "50")−(the pixel value of the right parallax output pixel 420, "46")=4 to obtain the differential pixel value ΔLR (1, 1) between the target pixel 400 and the right parallax output pixel 420. Likewise. the differential computing unit 231 computes the differential pixel value ΔLR (−1, 1) between the target pixel 400 and the right parallax output pixel 430, the differential pixel value ΔLR (−1, −1) between the target pixel 400 and the right parallax output pixel 440, and the differential pixel value ΔLR (1, −1) between the target pixel 400 and the right parallax output pixel 450. In the present example, the coordinates (1, 1), (−1, 1), (−1, −1), (1, −1) of the right parallax output pixels 420, 430, 440, 450 with reference to the target pixel 400 are provided on the right of the ΔLR to distinguish the differential pixel values ΔLR for the right parallax output pixels 420, 430, 440, 450.

In the above-described step S106 shown in FIG. 16, the data generating unit 232 of the image processing unit 205 generates differential data in which directions of the right parallax output pixels 420, 430, 440, 450 with reference to the target pixel 400 are associated with the corresponding differential pixel values ΔLR (1, 1), ΔLR (−1, 1), ΔLR (−1, −1), ΔLR (1, −1). As a method, the data generating unit 232 uses data of the coordinates (1, 1), (−1, 1) (−1, −1), (1, −1) of the right parallax output pixels 420, 430, 440, 450 with reference to the target pixel 400 as values indicating the directions of the right parallax output pixels 420, 430, 440, 450 with reference to the target pixel 400. Then the data generating unit 232 generates differential data in which the coordinate (1, 1) is associated with the differential pixel value ΔLR (1, 1), the coordinate (−1, 1) is associated with the differential pixel value ΔLR (−1, 1), the coordinate (−1, −1) is associated with the differential pixel value ΔLR (−1, −1), and the coordinate (1, −1) is associated with the differential pixel value ΔLR (1, −1).

Because the differential data according to the above-described method includes data about the coordinates, the size of the differential data becomes large. To cope with this, as shown in FIG. 21(b), the data generating unit 232 generates, as differential data 460, a data column "4, 30, 10, −4" in which the differential pixel values ΔLR (1, 1), ΔLR (−1, 1), ΔLR (−1, −1), ΔLR (1, −1) of the right parallax output pixels 420, 430, 440, 450 are arranged in a predetermined order. In the predetermined order, one, among the right parallax output pixels 420, 430, 440, 450, whose direction with reference to the target pixel 400 has a smaller angle with respect to the positive direction of the x-axis comes first. The angular range is from 0° to 360° counterclockwise with respect to the positive direction of the x-axis.

Specifically, first, the data generating unit 232 arranges the differential pixel value ΔLR (1, 1) of the pixel positioned in the (1, 1) direction (direction of 45°) whose angle with respect to the positive direction of the x-axis is smallest at the first place of the data column. Next, the data generating unit 232 arranges the differential pixel value ΔLR (−1, 1) of the pixel positioned in the (−, 1) direction (direction of 135°) whose angle with respect to the positive direction of the x-axis is second smallest at the second place of the data column. Then, the data generating unit 232 arranges the differential pixel value ΔLR (−1, −1) of the pixel positioned in the (−1, −1) direction (direction of 225°) whose angle with respect to the positive direction of the x-axis is third smallest at the third place of the data column. Last, the data generating unit 232 arranges the differential pixel value ΔLR (1, −1) of the pixel positioned in the (1, −1) direction (direction of 315°) whose angle with respect to the positive direction of the x-axis is largest at the last place of the data column.

By arranging the differential pixel values ΔLR (1, 1), ΔLR (−1, 1), ΔLR (−1, −1), ΔLR (1, −1) in the order based on the directions of the right parallax output pixels 420, 430, 440, 450 with reference to the target pixel 400, the differential pixel values ΔLR (1, 1), ΔLR (−1, 1), ΔLR (−1, −1), ΔLR (1, −1) can be associated with the directions of the right parallax output pixels 420, 430, 440, 450 with reference to the target pixel 400. Although in the present example, the data generating unit 232 sets the order based on the angles with respect to the positive direction of the x-axis, the order is not limited thereto, and may be set based on the angles with respect to the positive direction of the y-axis.

Figure 22:
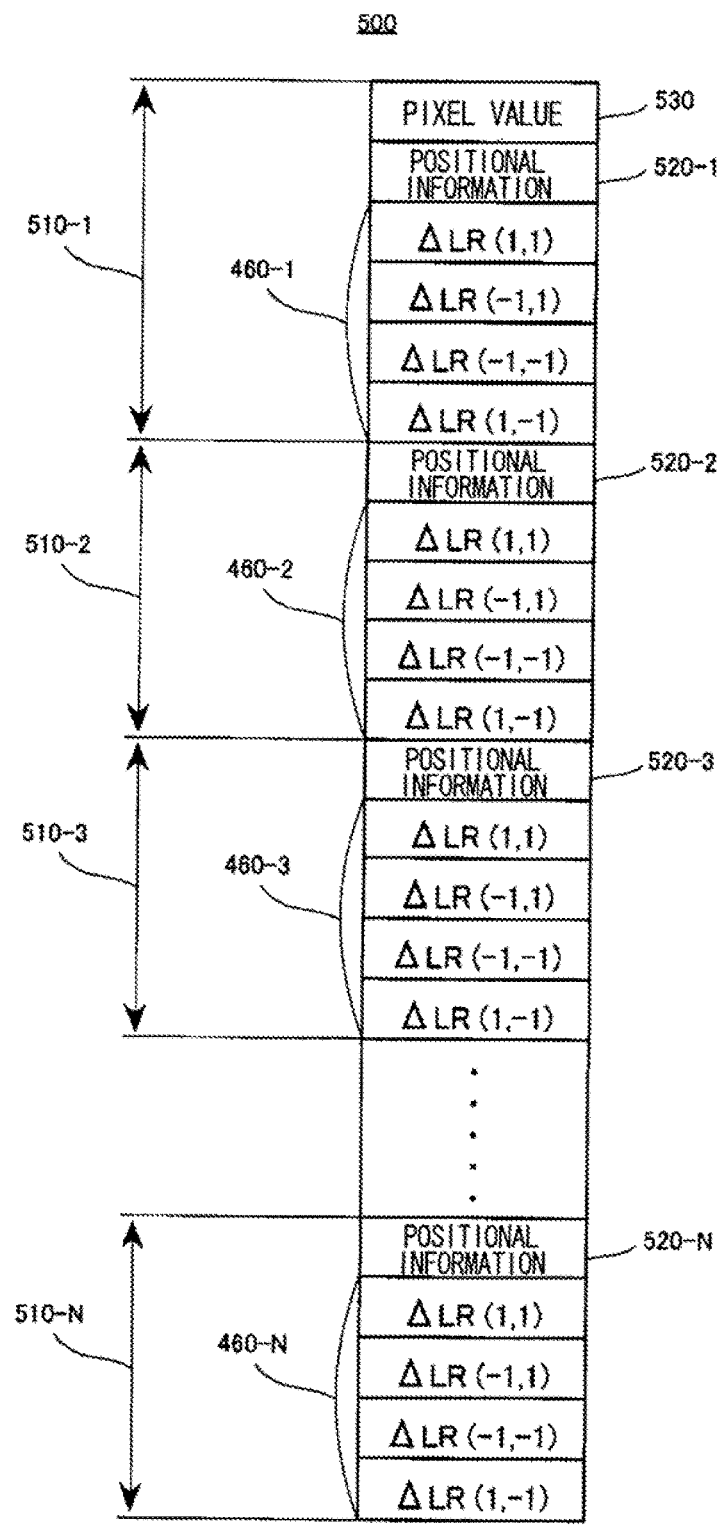
FIG. 22 is a table showing an exemplary differential data set in the first example.

FIG. 22 is a table showing an exemplary differential data set in the first example. The data generating unit 232 of the image processing unit 205 generates a differential data set 500 including a plurality of sections 510 (510-1, 510-2, 510-3, . . . 510-N). The data generating unit 232 stores a plurality of pieces of the differential data 460 (460-1, 460-2, 460-3, . . . 460-N) generated at the step S106 in the plurality of sections 510 (510-1, 510-2, 510-3, . . . 510-N), respectively.

The data generating unit 232 stores positional information 520 (520-1, 520-2, 520-3, . . . 520-N) of the target pixels corresponding to the differential data 460 (460-1, 460-2, 460-3, . . . 460-N) in the plurality of sections 510 (510-1, 510-2, 510-3, . . . 510-N), respectively. Specifically, the data generating unit 232 acquires the address information of the target pixels in the target pixel setting process at the step S102 or in the pixel value acquiring process at the step S104 that are described above with reference to FIG. 16, and stores the address information as the positional information 520. Also, the data generating unit 232 may store information about offsets from the reference pixel as the positional information 520-2, 520-3, . . . 520-N of the target pixels other than the reference pixel. Thereby, the positional information 520 (520-1, 520-2, 520-3, . . . 520-N) of the target pixels is associated with the corresponding differential data 460 (460-1, 460-2, 460-3, . . . 460-N).

Furthermore, the data generating unit 232 stores a pixel value 530 of the reference pixel in the section 510-1 that stores the differential data 460-1 corresponding to the reference pixel. Thereby, the pixel value 530 of the reference pixel is associated with the differential data 460-1 corresponding to the reference pixel.

Figure 23:
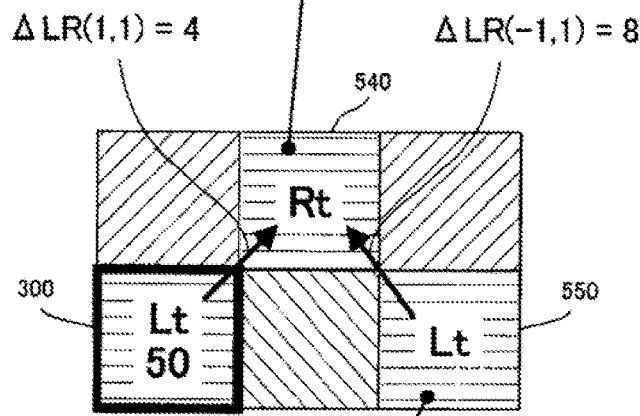
FIG. 23 is a diagram for showing exemplary pixel value computation in the first example.

The image processing unit 205 can calculate the pixel values of other parallax output pixels using the pixel value of the reference pixel and the differential pixel values. For example, as shown in FIG. 23, the image processing unit 205 refers to the differential pixel value ΔLR (1, 1) between the reference pixel 300 and the right parallax output pixel 540 among the differential data about the reference pixel 300, performs calculation of (the pixel value of the reference pixel 300, "50")–(the differential pixel value ΔLR (1, 1) of the reference pixel 300, "4"), and obtains the pixel value of the right parallax output pixel 540, "46". Also, the image processing unit 205 refers to the above-described differential pixel value ΔLR (1, 1) of the reference pixel 300 and the differential pixel value ΔLR (−1, 1) between the left parallax output pixel 550 and the right parallax output pixel 540 among the differential data about the left parallax output pixel 550, performs calculation of (the pixel value of the reference pixel 300, "50")–(the differential pixel value ΔLR (1, 1) of the reference pixel 300, "4")+(the differential pixel value ΔLR (−1, 1) of the left parallax output pixel 550 "8"), and obtains the pixel value of the left parallax output pixel 550, "54". By storing the pixel value of the reference pixel in the differential data set in this manner, the image processing unit 205 can calculate the pixel value of each left parallax output pixel and the pixel value of each right parallax output pixel even if the image processing unit 205 does not have the pixel value data of each left parallax output pixel and the pixel value data of each right parallax output pixel.

The image processing unit 205 can determine the presence or absence of a depth in a captured image by using the differential data set. Specifically, the image processing unit 205 analyzes a place where the differential pixel value in the differential data set exceeds a threshold to determine the presence or absence of a depth. The threshold is preset as a value that indicates a change in luminance exceeding a noise level.

The storage control unit 233 of the image processing unit 205 stores the differential data set 500 in the memory card 220 in a file format. Thereby, the image processing unit 205 reads out the differential data set at a required timing such as at the time of the image display process to determine the presence or absence of a depth in the captured image.

Next, the identical parallax differential data set generation process is explained. An identical parallax differential data set is used together with the above-described differential data set to easily determine the presence or absence of a depth of a subject image in the captured image. With a process similar to the above described flow process, the image processing unit 205 computes an identical parallax differential value that is a differential between the pixel value of the target pixel and the pixel value of a single first parallax output pixel of each of a plurality of the first parallax output pixels positioned around the target pixel. Then, the image processing unit 205 generates the identical parallax differential data set including identical parallax differential data in which a direction of the single first parallax output pixel or each of the plurality of first parallax output pixels with reference to the target pixel is associated with the corresponding identical parallax differential value. The identical parallax differential data set generation process and the above-described differential data set generation process may be executed concurrently.

Figure 24:
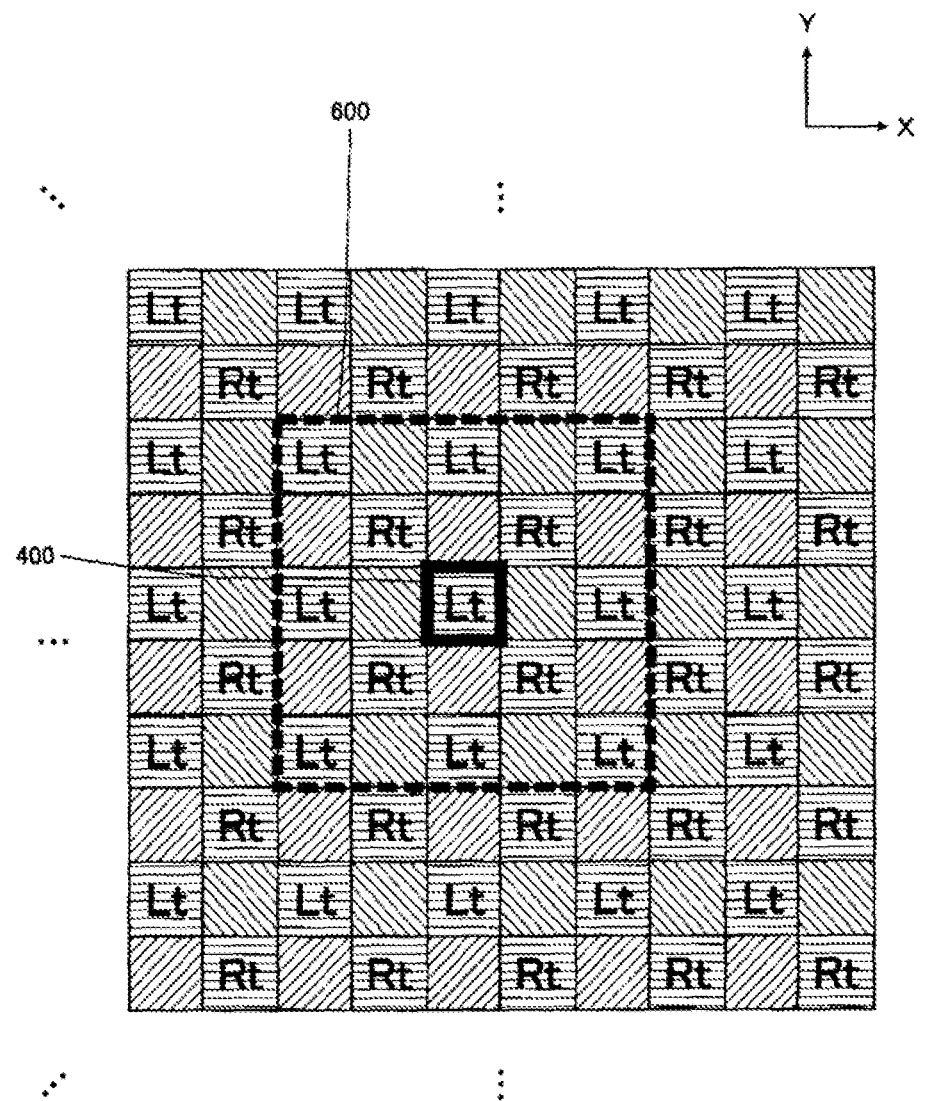
FIG. 24 is a diagram for explaining the area setting process in an identical parallax differential data set generation process in the first example.

FIG. 24 is a diagram for explaining the area setting process in the identical parallax differential data set generation process in the first example. The image processing unit 205 sets an identical parallax target area 600 with i×j pixels including a single left parallax output pixel or at plurality of the left parallax output pixel centered around the target pixel 400. Here, i and j are integers equal to or larger than three. When both i and j are odd numbers., the image processing unit 205 sets the identical parallax target area 600 with the target pixel 400 as the center thereof. On the other hand, When either or both of i and j is/are an even number(s), the image processing unit 205 sets the identical parallax target area 600 with the target pixel 400 as the pixel closest to the center thereof.

The image processing unit 205, for example, sets the identical parallax target area 600 to include at least a left parallax output pixel positioned to the right with reference to the target pixel 400. Also, the image processing unit 205 may set the identical parallax target area 600 to include at least two left parallax output pixels positioned in the two vertical directions, the two horizontal directions, or two diagonal directions with reference to the target pixel 400. Furthermore, the image processing unit 205 may set the identical parallax target area 600 to include at least for left parallax output pixels positioned in the four vertical and horizontal directions, or the four diagonal directions with reference to the target pixel 400. In the present example, the image processing unit 205 sets the identical parallax target area 600 with 5×5 pixels including eight left parallax output pixels centered around the target pixel 400 and positioned in the four vertical and horizontal directions and the four diagonal directions.

Figures 25A, 25B:
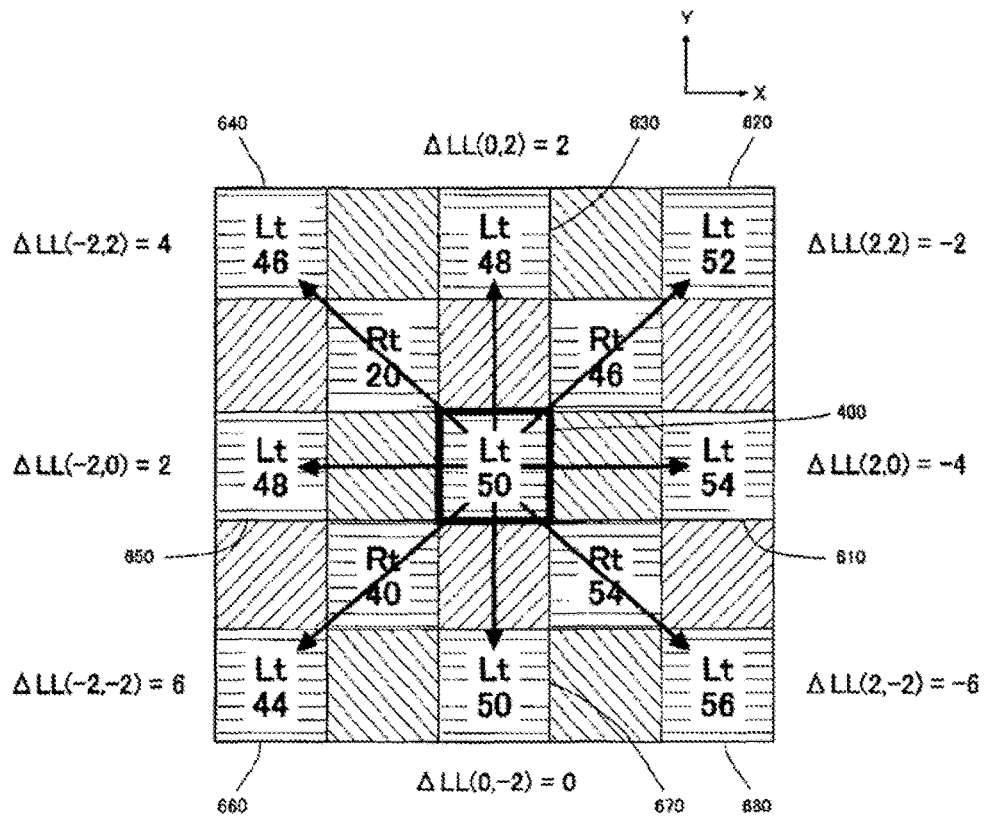
FIG. 25(a) is a diagram for explaining a differential computation process in the identical parallax differential data set generation process in the first example.
FIG. 25(b) is a table for showing exemplary identical parallax differential data in the identical parallax differential data set generation process in the first example.

FIG. 25(a) is a diagram for explaining the differential computation process in the identical parallax differential data set generation process in the first example. The differential computing unit 231 of the image processing unit 205 computes a plurality of differential pixel values ΔLL (2, 0), ΔLL (2, 2), ΔLL (0, 2), ΔLL (−2, 2), ΔLL, (−2, 0), ΔLL (−2, −2), ΔLL (0, −2), ΔLL (2, −2) of a plurality of left parallax output pixel 610, 620, 630, 640, 650, 660, 670, 680 included in the target area 410, the differential pixel values being computed with reference to the target pixel 400. The differential computing unit 231 computes the differential pixel values ΔLL (2, 0), ΔLL (2, 2), ΔLL (0, 2), ΔLL (−2, 2), ΔLL (−2, 0), ΔLL (−2, −2), ΔLL (0, −2), ΔLL (2, −2) by a method similar to the above-described method for the computation of the differential pixel values ΔLR (1, 1), ΔLR (−1, 1) ΔLR (−1, −1), ΔLR (1, −1).

As shown in FIG. 25(b), the data generating unit 232 of the image processing unit 205 generates, as identical parallax differential data 690, a data column "−4, −2, 2, 4, 2, 6, 0, −6" in which the differential pixel values ΔLL (2, 0), ΔLL (2, 2), ΔLL (0, 2), ΔLL (−2, 2), ΔLL (−2, 0), ΔLL (−2, −2), ΔLL (0, −2), ΔLL (2, −2) are arranged in a predetermined order by a method similar to the above-described method for the differential data generation process.

The data generating unit 232 may generate, as the identical parallax differential data 690, a data column "−2, 4, 6, −6" in which the differential pixel values ΔLL (2, 2), ΔLL (−2, 2), ΔLL (−2, −2), ΔLL (2, −2) of the pixels positioned in the four diagonal directions are arranged in a predetermined order without including the differential pixel values ΔLL (2, 0), ΔLL (0, 2), ΔLL (−2, 0), ΔLL (0, −2) of the pixels positioned in the four vertical and horizontal directions. Thereby, the amount of the identical parallax differential data 690 can be made smaller.

Also, the data generating unit 232 may generate, as the identical parallax differential data 690, a data column "−4, 2, 2, 0" in which the differential pixel values ΔLL (2, 0), ΔLL (0, 2), ΔLL (−2, 0), ΔLL (0, −2) of the pixels positioned in the four vertical and horizontal directions are arranged in a predetermined order without including the differential pixel values ΔLL (2, 2), ΔLL (−2, 2), ΔLL (−2, −2), ΔLL (2, −2) of the pixels positioned in the four diagonal directions. Thereby, the amount of the identical parallax differential data 690 can be made smaller.

The data generating unit 232 of the image processing unit 205 generates the identical parallax differential data set in a format similar to the format of the differential data set 500 shown in FIG. 22. Thereby, the image processing unit 205 can determine the presence or absence of a depth in a captured image using the identical parallax differential data set. Specifically, the image processing unit 205 analyzes a place where the differential pixel value in the differential data set exceeds a threshold and a place where the identical parallax differential value in the identical parallax differential data set exceeds the threshold to determine the presence or absence of a depth. The threshold is preset as a value, that indicates a change in luminance exceeding a noise level.

The storage control unit 233 of the image processing unit 205 stores the place where the identical parallax differential value in the differential data set 500 and the identical parallax differential data set exceeds the threshold in the memory card 220 in a file format. Thereby, the image processing unit 205 reads out the place where the identical parallax differential value in the differential data set and the identical parallax differential data set exceeds the threshold at a required timing such as at the time of the image display process to determine the presence or absence of a depth in the captured image.

Figure 26:
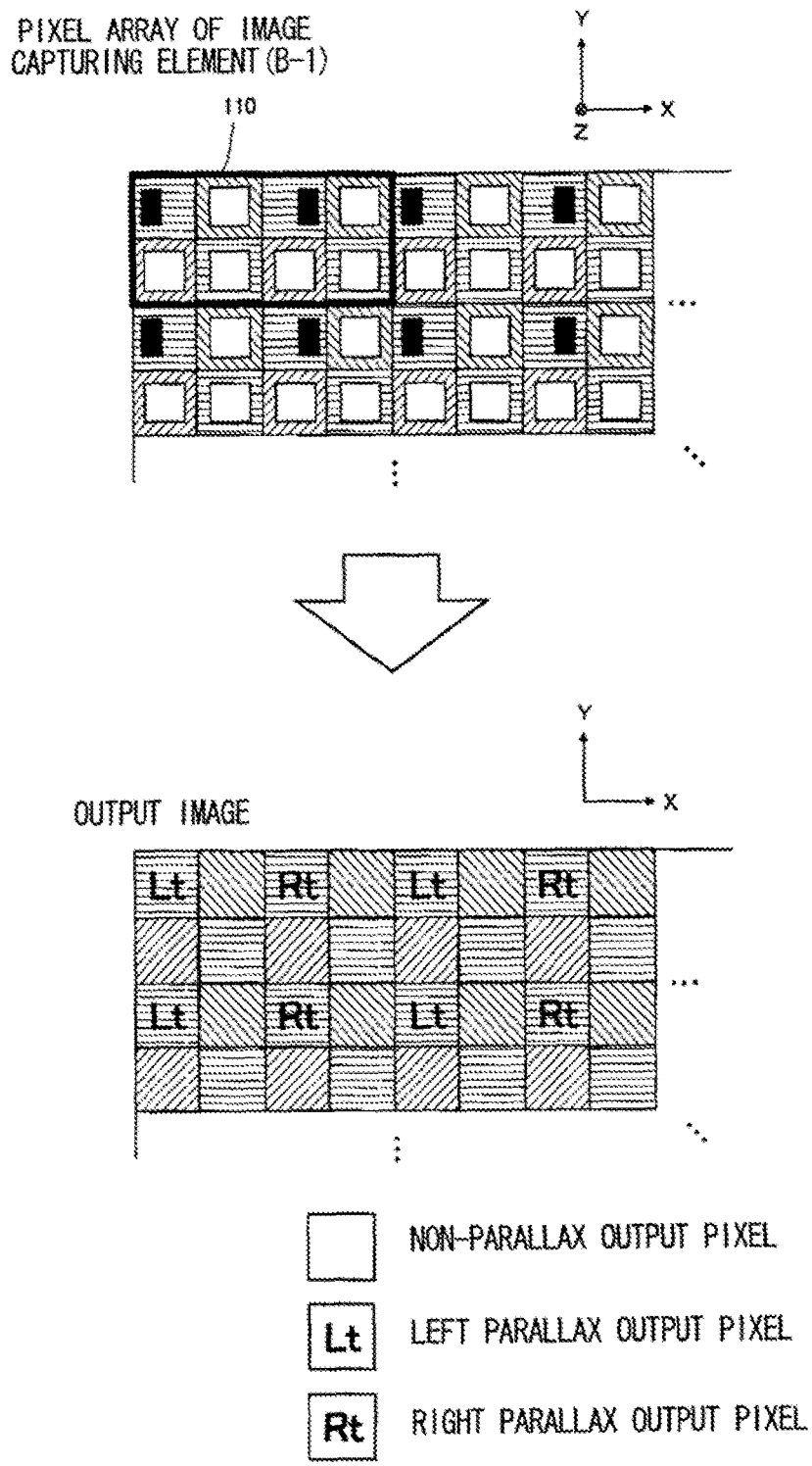
FIG. 26 is a diagram for explaining captured image data in a second example.

A second example using the image capturing element 100 having the pixel array shown in FIG. 12 is explained. FIG. 26 is a diagram for explaining captured image data in the second example. The parallax L pixel with an aperture part off-centered to the left outputs a green left parallax output pixel. The parallax R pixel with an aperture part off-centered to the right outputs a green right parallax output pixel. The R pixel, the G pixel and the B pixel that are non-parallax pixels output a red non-parallax output pixel, a green non-parallax output pixel, and a blue non-parallax output pixel, respectively.

The left parallax output pixel group and the right parallax output pixel group form a parallax image from two perspectives. In the present example, the left parallax output pixel is referred to as a first parallax output pixel, and the right parallax output pixel is referred to as a second parallax output pixel. An x-axis and a y-axis corresponding to an x-axis and a y-axis of the image capturing element are set in the captured image data. The positive direction of the x axis is the rightward direction, and the positive direction of the y-axis is the upward direction. The captured image data acquiring process, the target pixel setting process, the pixel value acquiring process and the process of determining the target pixel setting are similar to those in the first example.

Figure 27:
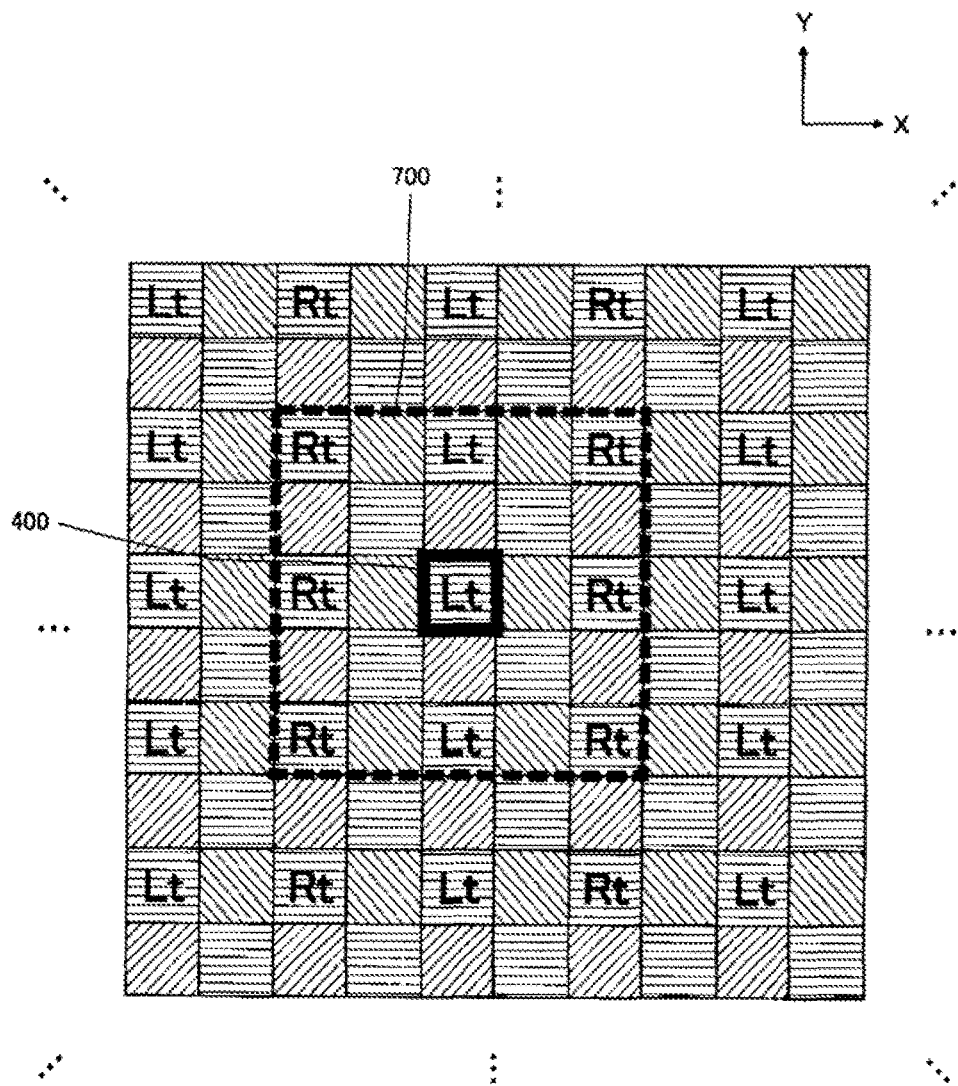
FIG. 27 is a diagram for explaining the area setting process in the second example.

FIG. 27 is a diagram for explaining the area setting process in the second example. In the present example, the image processing unit 205 sets a target area 700 with 5×5 pixels including six right parallax output pixels centered around the target pixel 400, and positioned in the two horizontal directions, and the four diagonal directions with reference to the target pixel 400. In this manner, the image processing unit 205 sets the target area 700 in the second example, which is different from the target area 410 in the first example, corresponding to the array patterns of the parallax L pixel group and the parallax R pixel group in the image capturing element 100.

Figures 28A, 28B:
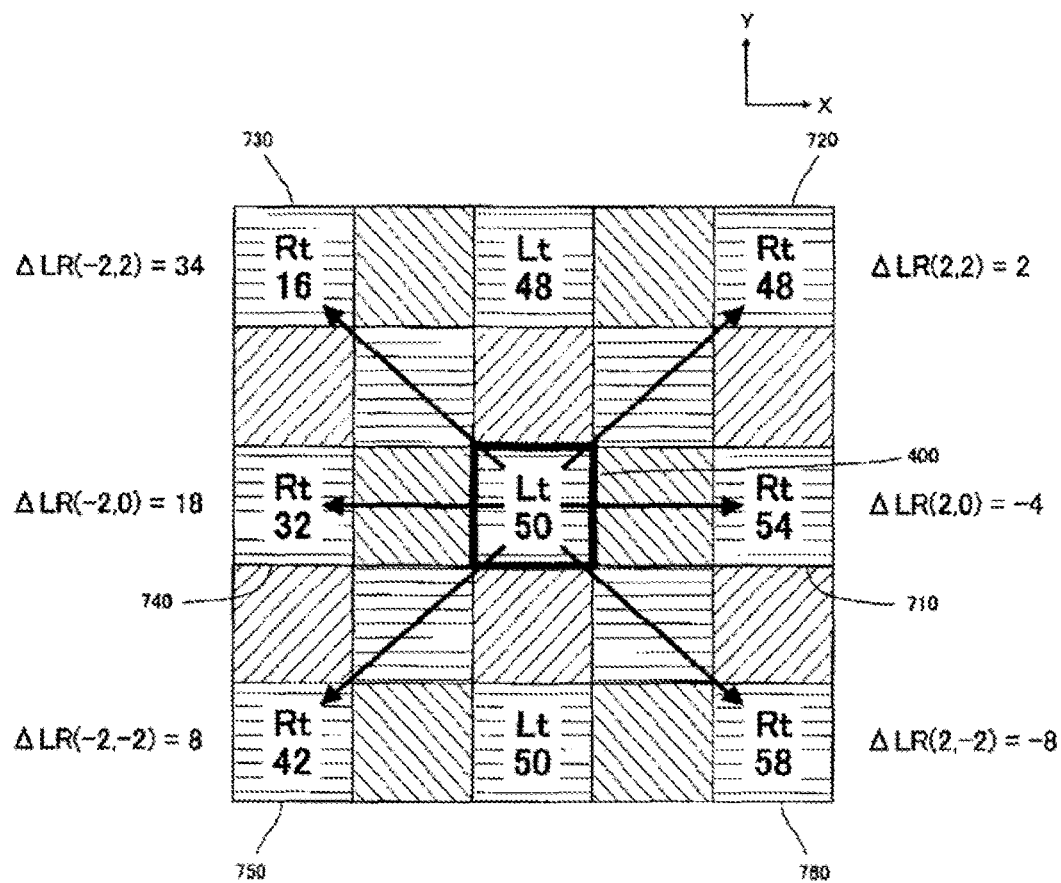
FIG. 28(a) is a diagram for explaining the differential computation process in the second example.
FIG. 28(b) is a table for showing exemplary differential data in the second example.

FIG. 28(a) is a diagram for explaining the differential computation process in the second example. The differential computing unit 231 of the image processing unit 205 computes six differential pixel values ΔLR (2, 0), ΔLR (2, 2), ΔLR (−2, 2), ΔLR (−2, 0), ΔLR (−2, −2), ΔLR (2, −2) of six right parallax output pixels 710, 720, 730 740, 750, 760 included in the target area 700, the differential pixel values being computed with reference to the target pixel 400. The differential computing unit 231 computes the differential pixel values ΔLR (2, 0), ΔLR (2, 2), ΔLR (−2, 2) ΔLR (−2, 0), ΔLR (−2, −2), ΔLR (2, −2) by a method similar to the above-described method for the computation of the differential pixel values ΔLR (1, 1), ΔLR (−1, 1), ΔLR (−1, −1), ΔLR (1, −1).

As shown in FIG. 28(b), the data generating unit 232 of the image processing unit 205 generates, as differential data 770, a data column "−4, 2, 34, 18, 8, −8" in which the differential pixel values ΔLR (2, 0), ΔLR (2, 2), ΔLR (−2, 2), ΔLR (−2, 0), ΔLR (−2, −2), ΔLR (2, −2) are arranged in a predetermined order by a method similar to the above-described method for the differential data generation process. The data generating unit 232 may generate, as the differential data 770, a data column "2, 34, 8, −8" in which the differential pixel values ΔLR (2, 2), ΔLR (−2, 2), ΔLR (−2, −2), ΔLR (2, −2) of the pixels positioned in the four diagonal directions are arranged in a predetermined order without including the differential pixel values ΔLR (2, 0), ΔLR (−2, 0) of the pixels positioned in the two horizontal directions. Thereby, the amount of the differential data 770 can be made smaller.

The data generating unit 232 of the image processing unit 205 generates the differential data set 500 by a method similar to the above-described method for the differential data set generation process. Thereby, the image processing unit 205 can determine the presence or absence of a depth in a captured image using the differential data set. Specifically, the image processing unit 205 analyzes a place where the differential pixel value in the differential data set exceeds a threshold to determine the presence or absence of a depth. The threshold is preset as a value that indicates a change in luminance exceeding a noise level.

The storage control unit 233 of the image processing twit 205 stores the differential data set 500 in the memory card 220 in a file format. Thereby, the image processing unit 205 reads out the differential data set at a required timing such as at the time of the image display process to determine the presence or absence of a depth in the captured image.

When the image capturing element 100 having the pixel array shown in FIG. 15 is used, an only difference from the second example is that the uncolored left parallax output pixel and right parallax output pixel are output. Therefore, the process similar to that in the second example can be executed even when the image capturing element 100 having the pixel array shown in FIG. 15 is used.

Figure 29:
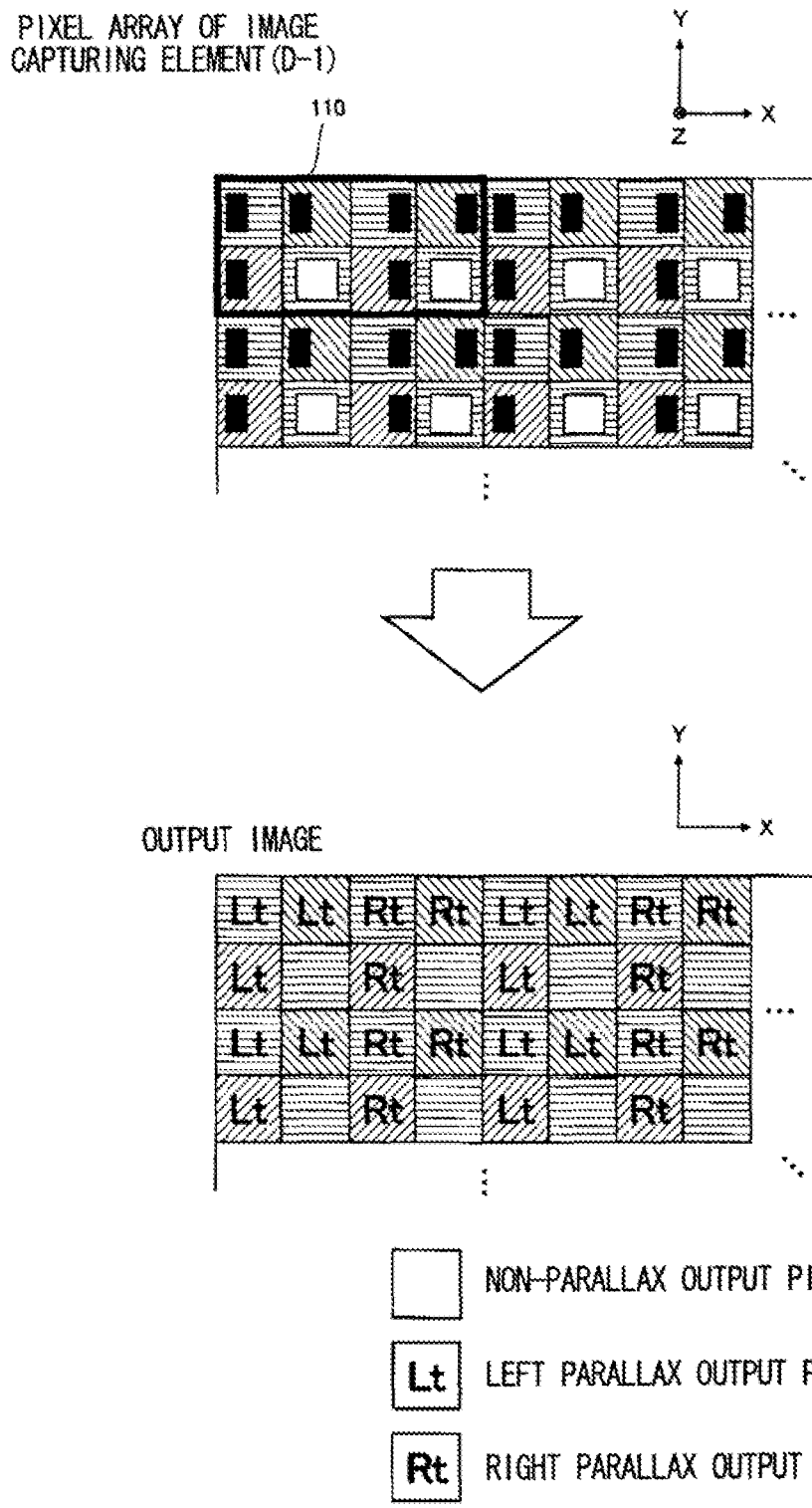
FIG. 29 is a diagram for explaining captured image data in a third example.

A third example using the image capturing element 100 having the pixel array shown in FIG. 13 is explained. FIG. 29 is as diagram for explaining captured image data in the third example. The parallax L pixel with an aperture part off-centered to the left outputs a red left parallax output pixel, a green left parallax output pixel, and a blue left parallax output pixel. The parallax R pixel with an aperture part off-centered to the right outputs a red right parallax output pixel, a green right parallax output pixel, and a blue right parallax output pixel. The pixel that is a non-parallax pixel outputs a green non-parallax output pixel.

Figure 30:
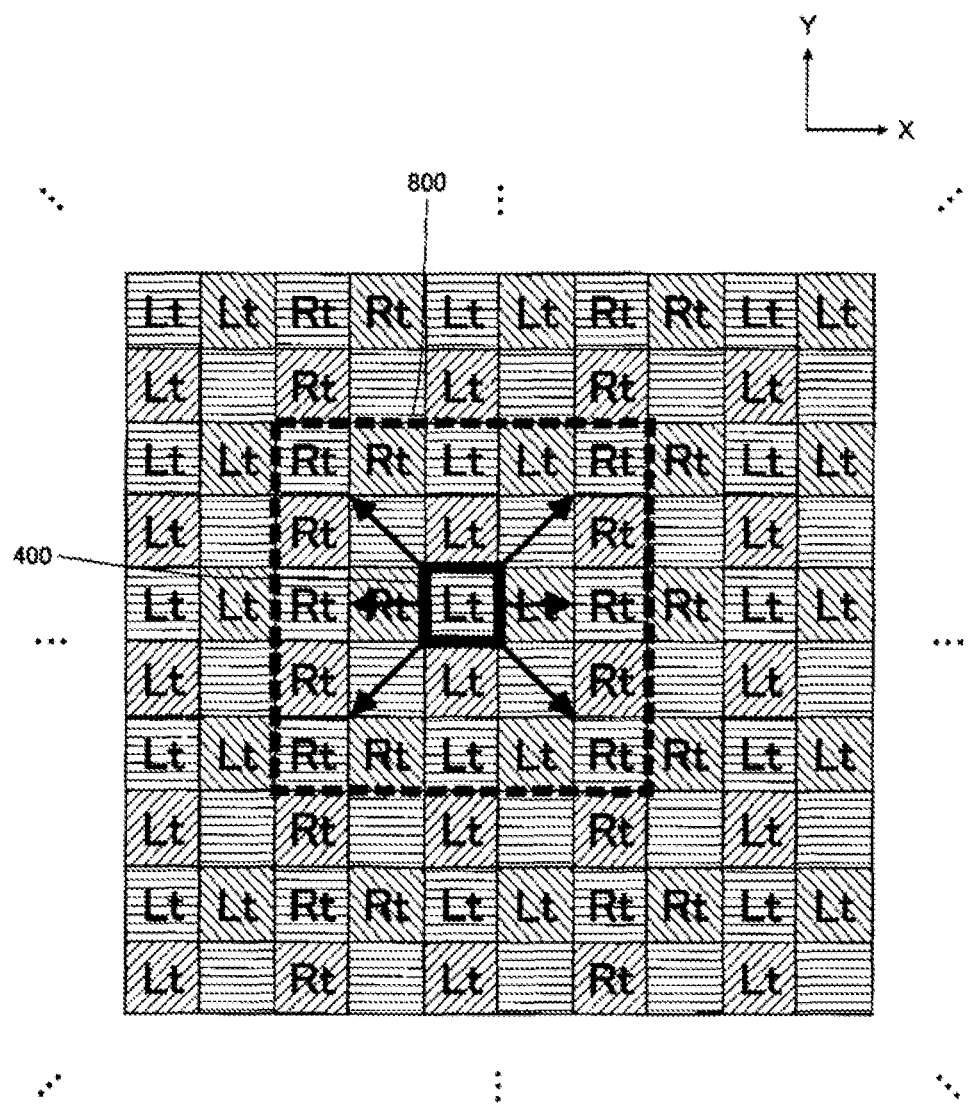
FIG. 30 is a diagram for explaining the area setting process in the third example.
Figure 31:
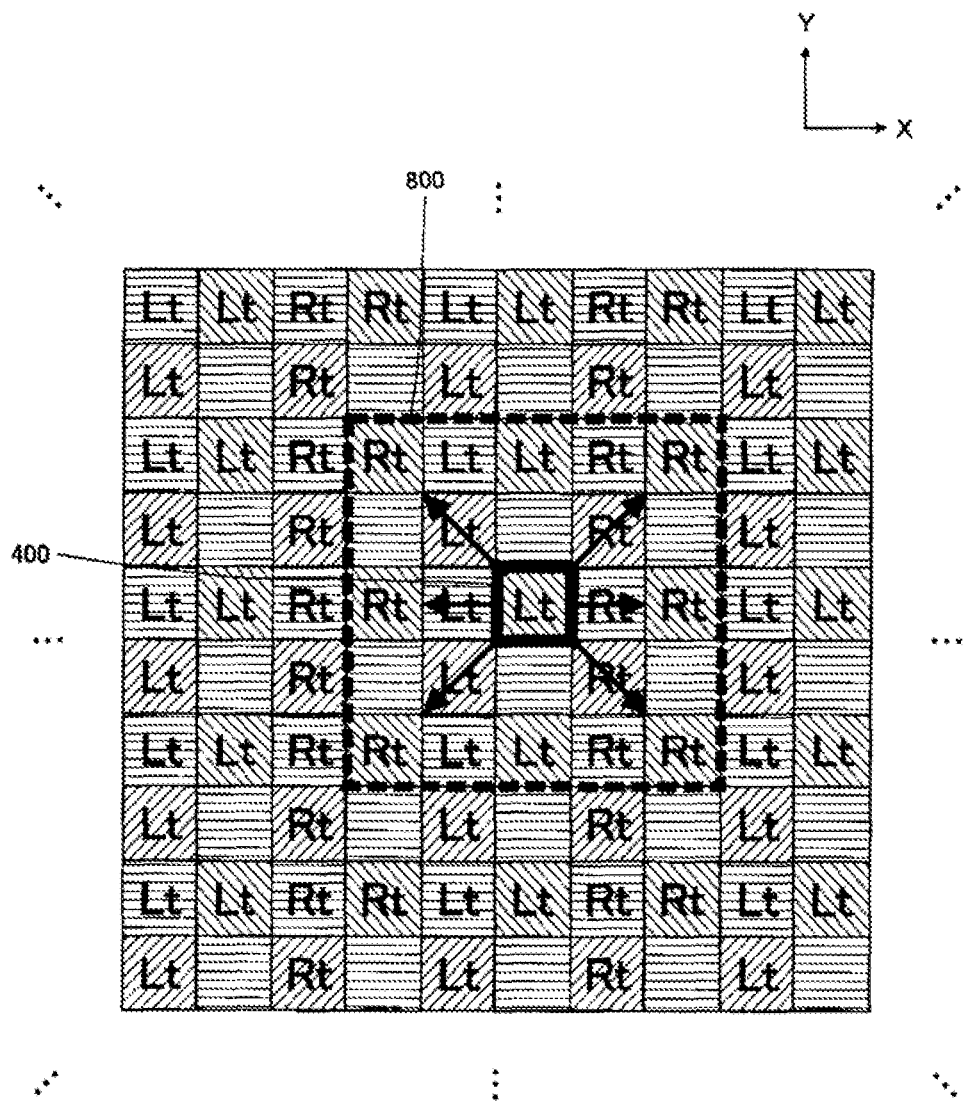
FIG. 31 is as diagram for explaining the area setting process in the third example.
Figure 32:
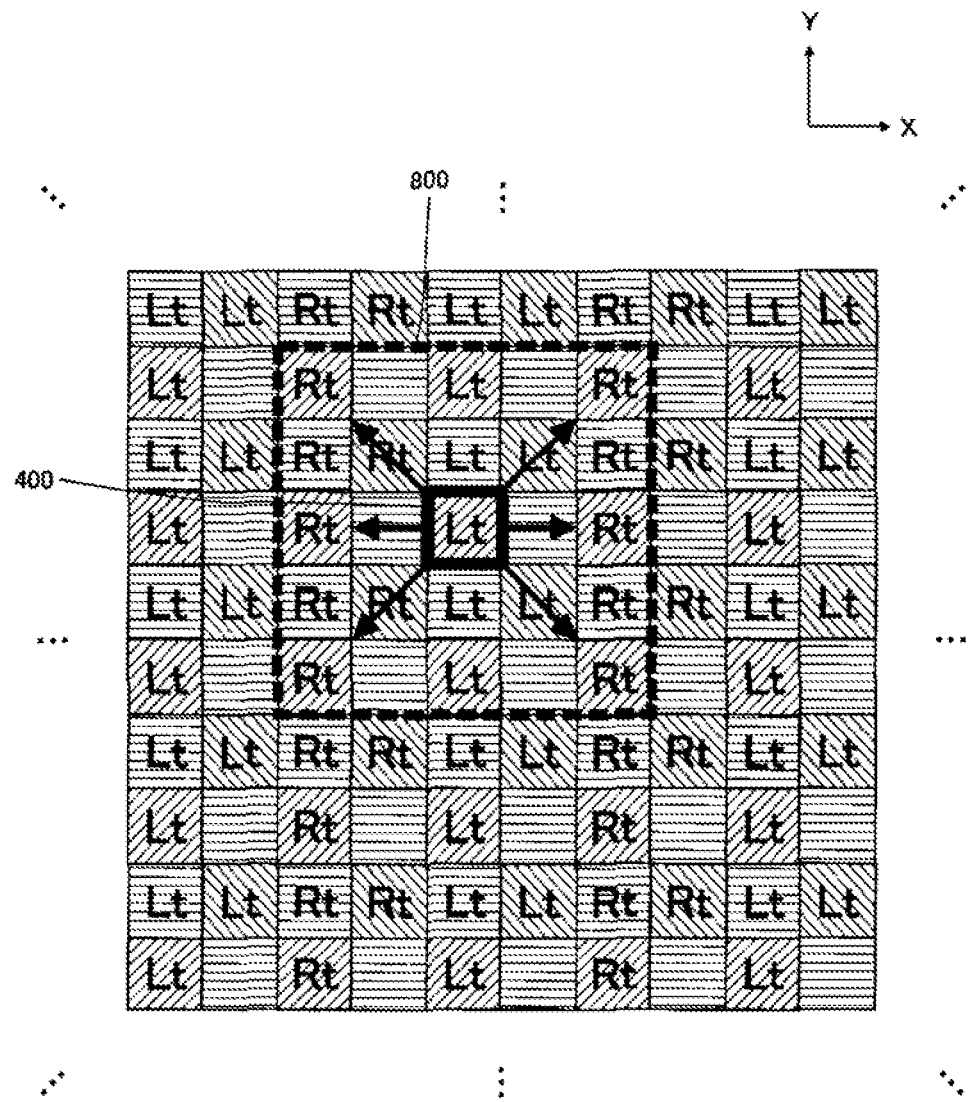
FIG. 32 is a diagram for explaining the area setting process in the third example.

The left parallax output pixel group and the right parallax output pixel group form in a parallax image from two perspectives. In the present example, the left parallax output pixel is referred to as a first parallax output pixel, and the right parallax output pixel is referred to as a second parallax output pixel. An x-axis and a y-axis corresponding to an x-axis and a y-axis of the image capturing element are set in the captured image data. The positive direction of the x axis is the rightward direction, and the positive direction of the y-axis is the upward direction. The captured image data acquiring process, the target pixel setting process, the pixel value acquiring process and the process of determining the target pixel setting are similar to those in the first example FIGS. 30 to 32 are diagrams for explaining the area setting process in the third example. In the case of FIG. 30, a green left parallax output pixel is set as the target pixel 400. In the case of FIG. 31, a blue left parallax output pixel is set as the target pixel 400. In the case of FIG. 32, a red left parallax output pixel is set as the target pixel 400. In order for a differential in pixel values due to a color difference to be not included in the differential pixel value, the differential computing unit 231 of the image processing unit 205 is required to compute the differential pixel value between parallax output pixels of the same color.

Accordingly, in the case of FIG. 30, the image processing unit 205 sets a target area 800 with 5×5 pixels including six right parallax output pixels positioned in the two horizontal directions and the four diagonal directions with reference to the target pixel 400. Also, in the case of FIG. 31, the image processing unit 205 sets a target area 800 with 5×5 pixels including six blue right parallax output pixels positioned in the two horizontal directions and the four diagonal directions with reference to the target pixel 400. Furthermore, in the case of FIG. 32, the image processing unit 205 sets a target area 800 with 5×5 pixels including six red right parallax output pixels positioned in the two horizontal directions and the four diagonal directions with reference to the target pixel 400.

In this manner, the image processing unit 205 sets the target area 800 to include a plurality of the right parallax output pixels of the same color with the color of the target pixel 400. Then, the image processing unit 205 computes a differential pixel value for each color to generate a differential data set for each color.

The data generating unit 232 of the image processing unit 205 generates the differential data set 500 by a method similar to the above-described method for the differential data set generation process. Thereby, the image processing unit 205 can determine the presence or absence of a depth in a captured image using the differential data set. Specifically, the image processing unit 205 analyzes a place where the differential pixel value in the differential data set exceeds a threshold to determine the presence or absence of a depth. The threshold is preset as a value that indicates a change in luminance exceeding a noise level.

The storage control unit 233 of the image processing unit 205 stores the differential data set 500 in the memory card 220 in a file format. Thereby, the image processing unit 205 can react out the differential data set at a required timing such as at the time of the image display process to determine the presence or absence of a depth in the captured image.

In the above-described examples, the left parallax output pixel is referred to as the first parallax output pixel, and the right parallax output pixel is referred to as the second parallax output pixel. However, the first parallax output pixel and the second parallax output pixel are not limited thereto. For example, the right parallax output pixel may be referred to as the first parallax output pixel, and the left parallax output pixel may be referred to as the second parallax output pixel. Also, using the image capturing element 100 in which the upper parallax pixel group and the lower parallax pixel that output an upper parallax image and as lower parallax image, respectively, to generate a vertical parallax are arrayed at mutually different positions, the upper parallax output pixel output by the upper parallax pixel may be referred to as the first parallax output pixel, and the lower parallax output pixel output by the lower parallax pixel may be referred to as the second parallax output pixel.

Also, in the above-described examples, the data generating unit 232 may arrange the differential data 460 (460-1, 460-2, 460-3, . . . 460-N) according to a predetermined arrangement order of the differential data 460. Specifically, the data generating unit 232 may arrange the differential data 460 (460-1, 460-2, 460-3, . . . 460-N) according to the setting order of target pixels shown in FIG. 18 or 19. In this case, because the arrangement order of the differential data 460 corresponds to the positions of the target pixels, the data generating unit 232 may omit the positional information 520-2, 520-3, . . . 520-N about the target pixels other than the reference pixel. By omitting the positional information 520-2, 520-3, . . . 520-N in this manner, the size of the differential data set can be made smaller.

At the above-described step S102 of the process flow shown in FIG. 16, the plurality of pixels in the captured image data may be preset as the reference pixels. Specifically, the image processing unit 205 may divide the captured image data into a plurality of areas, and preset the first parallax output pixel at the center of each area as the reference pixel. Also, the image processing unit 205 may preset all of the plurality of first parallax output pixels arranged leftmost in the captured image data as the reference pixels.

When a plurality of the reference pixels are preset, the image processing unit 205 selects, as the target pixel, one of the plurality of reference pixels according to a predetermined order. After generating differential data of the selected reference pixel, the image processing unit 205 sets the left parallax output pixel corresponding to the selected reference pixel sequentially as the target pixels to generate differential data sequentially. Then, when the image processing unit 205 sets the left parallax output pixel corresponding to the selected reference pixel as the target pixel, the image processing unit 205 selects a next reference pixel according to a predetermined order. The predetermined order, for example, starts from the upper left pixel to the upper right pixel, and then continues with the leftmost column below the upper left pixel to the rightmost column below the upper right column, and this is repeated.

At the above-described step S107 of the process flow shown in FIG. 16, when a first parallax output pixel in a specific area including the reference pixel has not been set as a target pixel, the image processing unit 205 may determine that there is a first parallax output pixel that has not been set as a target pixel. Furthermore, when there is an available space in the capacity of a buffer that can store other differential data, the image processing unit 205 may determine that there is a first parallax output pixel that has not been set as a target pixel.

When the process at the step S108 is executed in a state that there is a first parallax output pixel for which differential data has not been generated, the image processing unit 205 may determine whether to set another first parallax output pixel as a target pixel after the process at the step S108. In this case, when the image processing unit 205 determines to set another first parallax output pixel as a target pixel, the process returns to the step S102, and when the image processing unit 205 determines not to set another first parallax output pixel as a target pixel, the process proceeds to the step S109.

Furthermore, although the image processing unit 205 executes the differential data set generation process at the step S108 after the determination process at the step S107 in the above-described process flow shown in FIG. 16, the order of the processes is not limited thereto. For example, after generating the differential data at the step S106 the image processing unit 205 may execute the differential data set generation process of the step S108 and then execute the determination process of the step S107.

While the embodiments of the present invention has (have) been described, the technical scope of the invention is not limited to the above described embodiment(s). It is apparent to persons skilled in the an that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMERALS 10 digital camera
20 image capturing lens
21 optical axis
30, 31 subject
100 image capturing element
101 microlens
102 color filter
103 aperture mask
104 aperture part
105 wiring layer
106 wiring
107 aperture
108 photoelectric converting element
109 base plate
110 repetitive pattern
120 image capturing element
121 screen filter
122 color filter part
123 aperture mask part
201 control unit
202 A/D converting circuit
203 memory
204 driving unit
205 image processing unit
207 memory card IF
208 operation unit
209 display unit
210 LCD driving circuit
211 AF sensor
220 memory card
231 differential computing unit
232 data generating unit
233 storage control unit 300 reference pixel
310 area
320 area
330 horizontal area
340 horizontal area
400 target pixel
410 target area
420, 430, 440, 450 right parallax output pixel
460 differential data
500 differential data set
510 section
520 positional information
530 pixel value.
540 right parallax output pixel
550 left parallax output pixel
600 identical parallax target area
610, 620, 630, 640, 650, 660, 670, 680 left parallax output pixel
690 identical parallax differential data
700 target area
710, 720, 730, 740, 750, 760 right parallax output pixel
770 differential data
800 target area

What is claimed is:

1. An image capturing device comprising:
an image capturing element in which a first parallax pixel group and a second parallax pixel group that output a first parallax image and a second parallax image, respectively, to cause a parallax are arranged at mutually different positions;
an image processor configured to
compute a differential pixel value of each of a plurality of second parallax output pixels in the second parallax image positioned around a target pixel that is a first parallax output pixel of the first parallax image, the differential pixel value being computed with reference to the target pixel,
generate a differential data set including a plurality of pieces of differential data in which a direction of each of the plurality of second parallax output pixels is associated with the corresponding differential pixel value, and
arrange, for each of the differential data, the differential pixel value in an arrangement order based on directions of the plurality of second parallax output pixels with reference to the target pixel; and
a memory that stores the differential data set in a file format.

2. The image capturing device according to claim 1, wherein the image processor is further configured to
set each of a plurality of first parallax output pixels in the first parallax image as the target pixel,
compute the differential pixel value with reference to each of the plurality of first parallax output pixels, and
generate the differential data for each of the plurality of first parallax output pixels, and
generate the differential data set including the generated differential data.

3. The image capturing device according to claim 2, wherein the image processor is further configured to
associate positional information of the target pixel with the differential data for the target pixel to generate the differential data set.

4. The image capturing device according to claim 2, wherein the image processor is further configured to arrange the differential data in a predetermined arrangement order of the differential data to generate the differential data set.

5. The image capturing device according to claim 2, wherein the image processor is further configured to
associate the differential data corresponding to a reference pixel in the first parallax image with a pixel value of the reference pixel to generate the differential data set.

6. The image capturing device according to claim 1, wherein the image processor is further configured to
set, as a target area, an m×n pixel area (m and n are integers equal to or larger than three) centered around the target pixel and including the plurality of second parallax output pixels of the second parallax image; and
compute the differential pixel value of each of the plurality of second parallax output pixels included in the target area, the differential pixel value being computed with reference to the target pixel.

7. The image capturing device according to claim 6, wherein the image processor is further configured to
set the target area according to array patterns of the first parallax pixel group and the second parallax pixel group in the image capturing element.

8. The image capturing device according to claim 6, wherein the image processor is further configured to
set the target area including the plurality of second parallax output pixels of a color same as the color of the target pixel.

9. The image capturing device according to claim 1, wherein the image processor is further configured to
compute an identical parallax differential value that is a differential pixel value for a single first parallax output pixel or each of a plurality of first parallax output pixels of the first parallax image positioned around the target pixel, the identical parallax differential value being computed with reference to the target pixel, and
generate identical parallax differential data in which a direction of the single first parallax output pixel or each of the plurality of first parallax output pixels with reference to the target pixel is associated with the identical parallax differential value.

10. The image capturing device according to claim 9, wherein the image processor is further configured to
generate an identical parallax differential data set including a plurality of pieces of the identical parallax differential data.

11. The image capturing device according to claim 10, wherein the image processor is further configured to
set each of the plurality of first parallax output pixels in the first parallax image as the target pixel, and computes the identical parallax differential value with reference to each of the plurality of first parallax output pixels, and
generate the identical parallax differential data for each of the plurality of first parallax output pixels, and
generate the identical parallax differential data set including the generated identical parallax differential data.

12. The image capturing device according to claim 10, wherein the image processor is further configured to
store the differential data set and the identical parallax differential data set in the memory in the file format.

13. The image capturing device according to claim 9, wherein the image processor is further configured to
set, as a target area, an m×n pixel area (m and n are integers equal to or larger than three) centered around the target pixel and including the plurality of second parallax output pixels of the second parallax image;
set, as an identical parallax target area, an i×j pixel area (i and j are integers equal to or larger than three) centered around the target pixel and including a single first parallax output pixel or a plurality of first parallax output pixels of the second parallax image;
compute the differential pixel value of each of the plurality of second parallax output pixels included in the target area, the differential pixel value being computed with reference to the target pixel; and
compute the identical parallax differential value of the single first parallax output pixel or the plurality of first parallax output pixels included in the identical parallax target area, the identical parallax differential value being computed with reference to the target pixel.

14. The image capturing device according to claim 1, wherein
the image capturing element has:
photoelectric converting elements that convert an incident light into an electrical signal and are arrayed two-dimensionally; and
aperture masks each provided corresponding to each of the photoelectric converting elements,
an aperture of each of the aperture masks provided corresponding to at least two of the photoelectric converting elements among adjacent n photoelectric converting elements (n is an integer equal to or larger than three) of the photoelectric converting elements is positioned to transmit a luminous flux from a mutually different partial area in a cross-sectional area of the incident light,
groups of the photoelectric converting elements, each group consisting of a set of the n photoelectric converting elements, are arrayed periodically and continuously, and
two of the photoelectric converting elements among the at least two photoelectric converting elements output a first parallax output pixel of the first parallax image and a second parallax output pixel of the second parallax image.

15. A non-transitory computer-readable medium having stored thereon a program to control an image capturing device having an image capturing element in which a first parallax pixel group and a second parallax pixel group that output a first parallax image and a second parallax image, respectively, to cause a parallax are arranged at mutually different positions,
the program causing a computer to:
compute a differential pixel value of each of a plurality of second parallax output pixels in the second parallax image positioned around a target pixel that is a first parallax output pixel of the first parallax image, the differential pixel value being computed with reference to the target pixel;
generate differential data in which a direction of each of the plurality of second parallax output pixels is associated with the corresponding differential pixel value;
arrange, for each of the differential data, the differential pixel value in an arrangement order based on directions of the plurality of second parallax output pixels with reference to the target pixel; and
store the differential data set in a memory in a file format.

16. A method for controlling an image capturing device having an image capturing element in which a first parallax pixel group and a second parallax pixel group that output a first parallax image and a second parallax image, respectively, to cause a parallax are arranged at mutually different positions, comprising:

computing a differential pixel value of each of a plurality of second parallax output pixels in the second parallax image positioned around a target pixel that is a first parallax output pixel of the first parallax image, the differential pixel value being computed with reference to the target pixel; and generating a differential data set including a plurality of pieces of differential data in which a direction of each of the plurality of second parallax output pixels is associated with the corresponding differential pixel value;

arranging, for each of the plurality of differential data, the differential pixel value in an arrangement order based on directions of the plurality of second parallax output pixels with reference to the target pixel; and storing the differential data set in a memory in a file format.

17. An image capturing device comprising:

an image capturing element in which a first parallax pixel group and a second parallax pixel group that output a first parallax image and a second parallax image, respectively, to cause a parallax are arranged at mutually different positions, the image capturing element comprising:

photoelectric converting elements that convert an incident light into an electrical signal and are arrayed two-dimensionally; and aperture masks each provided corresponding to each of the photoelectric converting elements, an aperture of each of the aperture masks provided corresponding to at least two of the photoelectric converting elements among adjacent n photoelectric converting elements (n is an integer equal to or larger than three) of the photoelectric converting elements is positioned to transmit a luminous flux from a mutually different partial area in a cross-sectional area of the incident light, groups of the photoelectric converting elements, each group consisting of a set of the n photoelectric converting elements, are arrayed periodically and continuously, and two of the photoelectric converting elements among the at least two photoelectric converting elements output a first parallax output pixel of the first parallax image and a second parallax output pixel of the second parallax image;

an image processor configured to:

compute a differential pixel value of each of a plurality of second parallax output pixels in the second parallax image positioned around a target pixel that is a first parallax output pixel of the first parallax image, the differential pixel value being computed with reference to the target pixel, and generate a differential data set including a plurality of pieces of differential data in which a direction of each of the plurality of second parallax output pixels is associated with the corresponding differential pixel value; and a memory that stores the differential data set in a file format.

* * * * *